US008068470B2

(12) United States Patent
Benveniste

(10) Patent No.: US 8,068,470 B2
(45) Date of Patent: *Nov. 29, 2011

(54) PREEMPTIVE PACKET FOR MAINTAINING CONTIGUITY IN CYCLIC PRIORITIZED MULTIPLE ACCESS (CPMA) CONTENTION-FREE SESSIONS

(75) Inventor: Mathilde Benveniste, South Orange, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 860 days.

This patent is subject to a terminal disclaimer.

(21) Appl. No.: 11/777,736

(22) Filed: Jul. 13, 2007
(Under 37 CFR 1.47)

(65) Prior Publication Data
US 2008/0013509 A1    Jan. 17, 2008

Related U.S. Application Data

(63) Continuation of application No. 10/256,309, filed on Sep. 27, 2002, now Pat. No. 7,245,605.

(60) Provisional application No. 60/330,930, filed on Nov. 2, 2001, provisional application No. 60/331,030, filed on Nov. 7, 2001, provisional application No. 60/331,211, filed on Nov. 13, 2001, provisional application No. 60/342,343, filed on Dec. 21, 2001.

(51) Int. Cl.
*H04W 4/00* (2009.01)
*H04B 7/212* (2006.01)
*H04L 12/413* (2006.01)

(52) U.S. Cl. ......... 370/338; 370/348; 370/444; 370/448
(58) Field of Classification Search .................. 370/338, 370/348, 444, 448
See application file for complete search history.

(56) References Cited

U.S. PATENT DOCUMENTS

| 4,987,571 A | 1/1991 | Haymond et al. |
| 5,142,433 A | 8/1992 | Nishibe et al. |
| 5,185,739 A | 2/1993 | Spear |
| 5,329,531 A | 7/1994 | Diepstraten et al. |

(Continued)

FOREIGN PATENT DOCUMENTS

EP    0994604 A2    4/2000

(Continued)

OTHER PUBLICATIONS

"Amendment- Radio Equipment and Systems (RES); High Performance Radio Local Area Network (HIPERLAN) Type 1; Functional Specification", ETSI, ETS 300 652, May 1997, pp. 1-21.

(Continued)

*Primary Examiner* — Alpus H Hsu

(57) ABSTRACT

An access point transmits a preemptive peg packet when it has no data to transmit in order to maintain the contiguity of its transmission timing position with respect to the timing position of other contention-free sessions (CFS) transmitted by other access points in an existing, periodic sequence. The cyclic prioritized multiple access (CPMA) method establishes the transmission timing position of contention-free sessions (CFS) between overlapping first and second wireless LAN cells contending for the same medium. Each cell includes a respective plurality of member stations. If an access point has no traffic, it will transmit a short, preemptive pegging packet and reset its backoff timer. In this manner, no gaps longer than the distributed coordination function (DCF) Interframe Space (DIFS) are left idle. This prevents other stations from using DCF contention to seize the channel, until all access points have completed one contention-free session (CFS) per periodic cycle.

20 Claims, 19 Drawing Sheets

U.S. PATENT DOCUMENTS

| | | | |
|---|---|---|---|
| 5,353,287 A | 10/1994 | Kuddes et al. |
| 5,355,375 A | 10/1994 | Christensen |
| 5,416,780 A | 5/1995 | Patel |
| 5,471,631 A | 11/1995 | Beardsley et al. |
| 5,636,223 A | 6/1997 | Reardon et al. |
| 5,644,576 A | 7/1997 | Bauchot et al. |
| 5,682,381 A | 10/1997 | Sekihata et al. |
| 5,768,267 A | 6/1998 | Raith et al. |
| 5,828,663 A | 10/1998 | Ikegami |
| 5,852,405 A | 12/1998 | Yoneda et al. |
| 5,852,723 A | 12/1998 | Kalkunte et al. |
| 5,892,769 A | 4/1999 | Lee |
| 5,987,033 A | 11/1999 | Boer et al. |
| 5,999,818 A | 12/1999 | Gilbert et al. |
| 6,011,784 A | 1/2000 | Brown et al. |
| 6,047,175 A | 4/2000 | Trompower |
| 6,052,594 A | 4/2000 | Chuang et al. |
| 6,055,578 A | 4/2000 | Williams et al. |
| 6,067,291 A | 5/2000 | Kamerman et al. |
| 6,078,591 A | 6/2000 | Kalkunte et al. |
| 6,199,170 B1 | 3/2001 | Dietrich |
| 6,246,702 B1 | 6/2001 | Fellman et al. |
| 6,272,117 B1 | 8/2001 | Choi et al. |
| 6,343,071 B1 | 1/2002 | Lansford |
| 6,418,148 B1 | 7/2002 | Kumar et al. |
| 6,434,187 B1 | 8/2002 | Beard et al. |
| 6,473,414 B1 | 10/2002 | Hartley et al. |
| 6,490,727 B1 | 12/2002 | Nazarathy et al. |
| 6,493,331 B1 | 12/2002 | Walton et al. |
| 6,614,799 B1 | 9/2003 | Gummalla et al. |
| 6,625,162 B2 | 9/2003 | Myojo et al. |
| 6,661,804 B2 | 12/2003 | Fellman et al. |
| 6,697,013 B2 | 2/2004 | McFarland et al. |
| 6,698,022 B1 | 2/2004 | Wu |
| 6,754,176 B1 | 6/2004 | Gubbi et al. |
| 6,791,997 B2 | 9/2004 | Beyer et al. |
| 6,795,418 B2 | 9/2004 | Choi |
| 6,832,093 B1 | 12/2004 | Ranta |
| 6,865,609 B1 | 3/2005 | Gubbi et al. |
| 6,907,023 B2 | 6/2005 | McKenna et al. |
| 6,963,549 B1 | 11/2005 | Jayaraman et al. |
| 6,985,499 B2 | 1/2006 | Elliot |
| 7,024,200 B2 | 4/2006 | McKenna et al. |
| 7,095,754 B2 | 8/2006 | Benveniste |
| 7,136,361 B2 | 11/2006 | Benveniste |
| 7,180,905 B2 | 2/2007 | Benveniste |
| 7,221,681 B2 | 5/2007 | Choi et al. |
| 7,245,604 B2 | 7/2007 | Benveniste |
| 7,245,605 B2 | 7/2007 | Benveniste |
| 7,248,600 B2 | 7/2007 | Benveniste |
| 7,251,232 B1 | 7/2007 | Meier |
| 7,266,085 B2 | 9/2007 | Stine |
| 7,277,413 B2 | 10/2007 | Benveniste |
| 7,277,415 B2 | 10/2007 | Benveniste |
| 7,280,517 B2 | 10/2007 | Benveniste |
| 7,286,827 B2 | 10/2007 | McKenna et al. |
| 7,379,432 B2 | 5/2008 | Benveniste |
| 7,409,700 B1 | 8/2008 | Watson |
| 7,773,625 B2 | 8/2010 | Benveniste |
| 2002/0061031 A1 | 5/2002 | Sugar et al. |
| 2002/0071448 A1 | 6/2002 | Cervello |
| 2002/0152324 A1 | 10/2002 | Sherman |
| 2002/0172186 A1 | 11/2002 | Larsson |
| 2002/0188723 A1 | 12/2002 | Choi et al. |
| 2003/0013451 A1 | 1/2003 | Walton |
| 2003/0103521 A1 | 6/2003 | Raphaeli et al. |
| 2003/0117984 A1 | 6/2003 | Gavette |
| 2003/0123405 A1 | 7/2003 | Del Prado et al. |
| 2003/0161340 A1 | 8/2003 | Sherman |
| 2003/0224787 A1 | 12/2003 | Gandolfo |
| 2004/0022219 A1 | 2/2004 | Mangold et al. |
| 2004/0047319 A1 | 3/2004 | Elg |
| 2006/0002357 A1 | 1/2006 | Sherman |
| 2006/0041676 A1 | 2/2006 | Sherman |
| 2007/0263581 A1 | 11/2007 | Benveniste |
| 2008/0002632 A1 | 1/2008 | Pandey et al. |
| 2008/0013508 A1 | 1/2008 | Benveniste |
| 2008/0013515 A1 | 1/2008 | Benveniste |
| 2008/0013522 A1 | 1/2008 | Benveniste |
| 2008/0019329 A1 | 1/2008 | Benveniste |
| 2008/0019343 A1 | 1/2008 | Benveniste |
| 2008/0291873 A1 | 11/2008 | Benveniste |

FOREIGN PATENT DOCUMENTS

| | | |
|---|---|---|
| WO | WO 03-039054 A2 | 5/2003 |
| WO | WO 03/041427 A1 | 5/2003 |

OTHER PUBLICATIONS

"Broadband Radio Access Network (BRAN); Hiperlan type 2; System Overview", ETSI, ETSI TR 101 683 VI.1.1 (Feb. 2000), Technical Report, pp. 1-19.

"Broadband Radio Access Networks (BRAN); Hiperlan Type 2; Data Link Control (DLC) Layer; Part 4: Extension for Home Environment" ETSI, ETSI TS 101 761-4 VI.2.1. (Dec. 2000), pp. 1-125.

Diepstraten, "Wireless Access Method and Physical Specification", IEEE, IEEE P802.11-93/70, May 1993, pp. 1-16 slides 1-6.

White, "Wireless Access Method and Physical Layer Specifications", IEEE, IEEE P802.11-93/159, Sep. 1993, pp. 1-8.

Diepstraten et al. Wireless Access Method and Physical Specification, IEEE, IEEE O802.11-94/150, Jul. 1994, pp. 1-12, Slides 1-11 & 1-23.

Andrew S. Tanenbaum, *Computer Networks*, 3ed, 1996 Prentice Hall, Chapter 4, "The Medium Access Sublayer", pp. 243-338.

James L. Massey, "Collision-Resolution Algorithms and Random-Access Communications, "Multi-User Communication Systems, edited by G. Long, Universita' di Trieste, 1981 by CISM, Udine, pp. 73-137.

Leonard Kleinrock et al., "Packet Switching in Radio Channels: Part I—Carrier Sense Multiple-Access Modes and Their Throughput-Delay Characteristics," IEEE Transactions on Communications, vol. Com-23, No. 12, Dec. 1975, pp. 1400-1416.

Ronald L. Rivest, "Network Control by Bayesian Broadcast," IEEE Transaction on Information Theory, vol. IT-33, May 1987, pp. 323-328.

Phil Karn, "MACA—A New Channel Access Method for Packet Radio," $9^{th}$ Computer Networking Conference, ARRL/CRRL Amateur Radio, 1990, pp. 134-140.

Vaduvur Bharghavan et al., "MACAU: A Media Access Protocol for Wireless LAN's", Computer Communication Review, vol. 24, No. 4, Oct. 1994, pp. 212-225.

The Bluetooth Special Interest group, Specification of Bluetooth System, Version 1.1, Feb. 22, 2001, pp. 41-47.

IEEE Std. 802.11, "Local and Metropolitan Area Networks", 1997, p. 92.

Bononi, L., et al. "Design and Performance Evaluation of an Asymptotically Optimal Backoff Algorithm for IEEE 802.11 Wireless LANs", Proceeding of the $33^{rd}$ Hawaii International Conference on System Sciences—2000, Jan. 4-7, 2000, pp. 1-10.

Deng, Dr-Jiunn, et al. "A Priority Scheme for IEEE 802.11 DCF Access Method", IEICE Trans. Communication, Jan. 1999, vol. E82-B, No. 1.

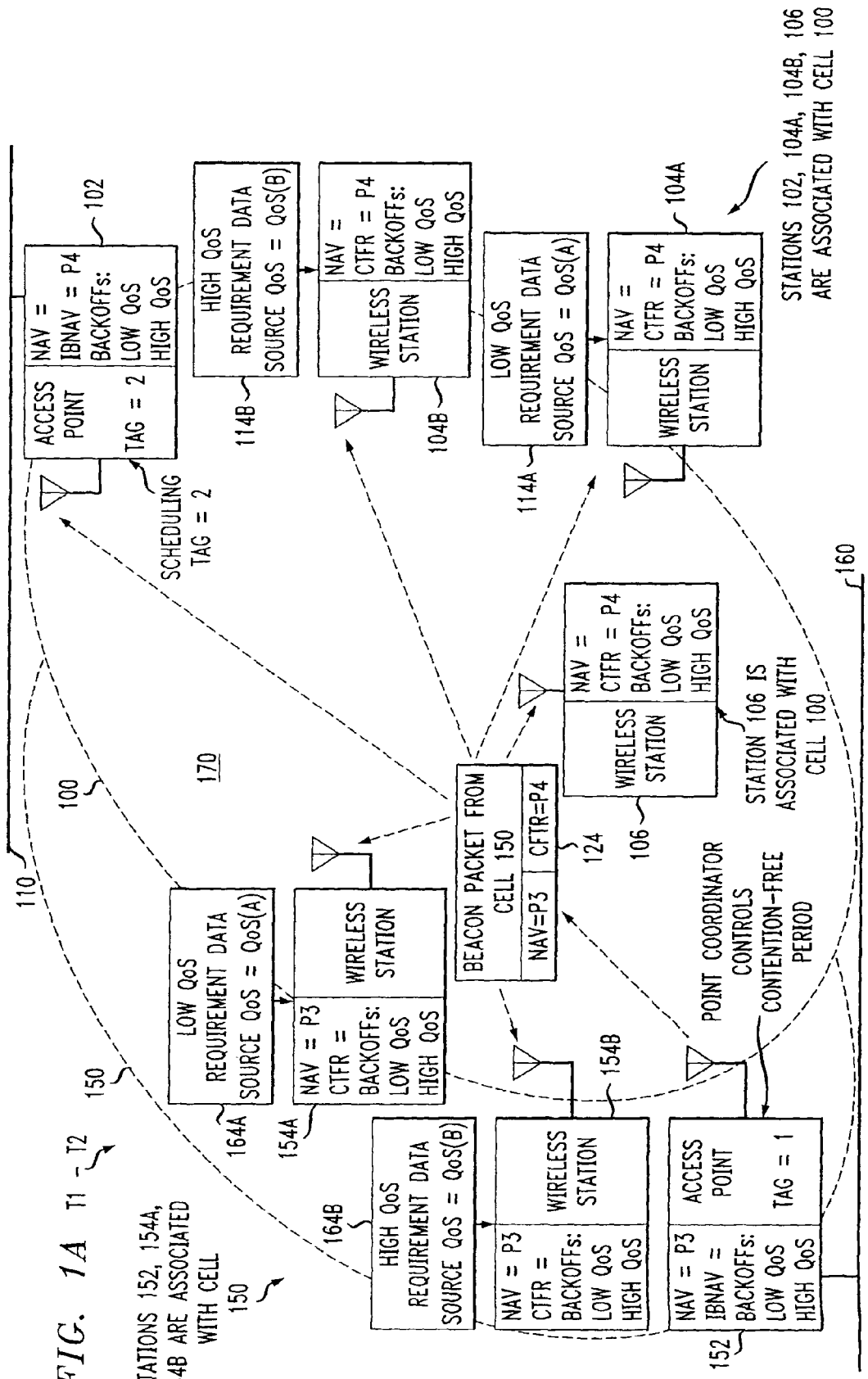

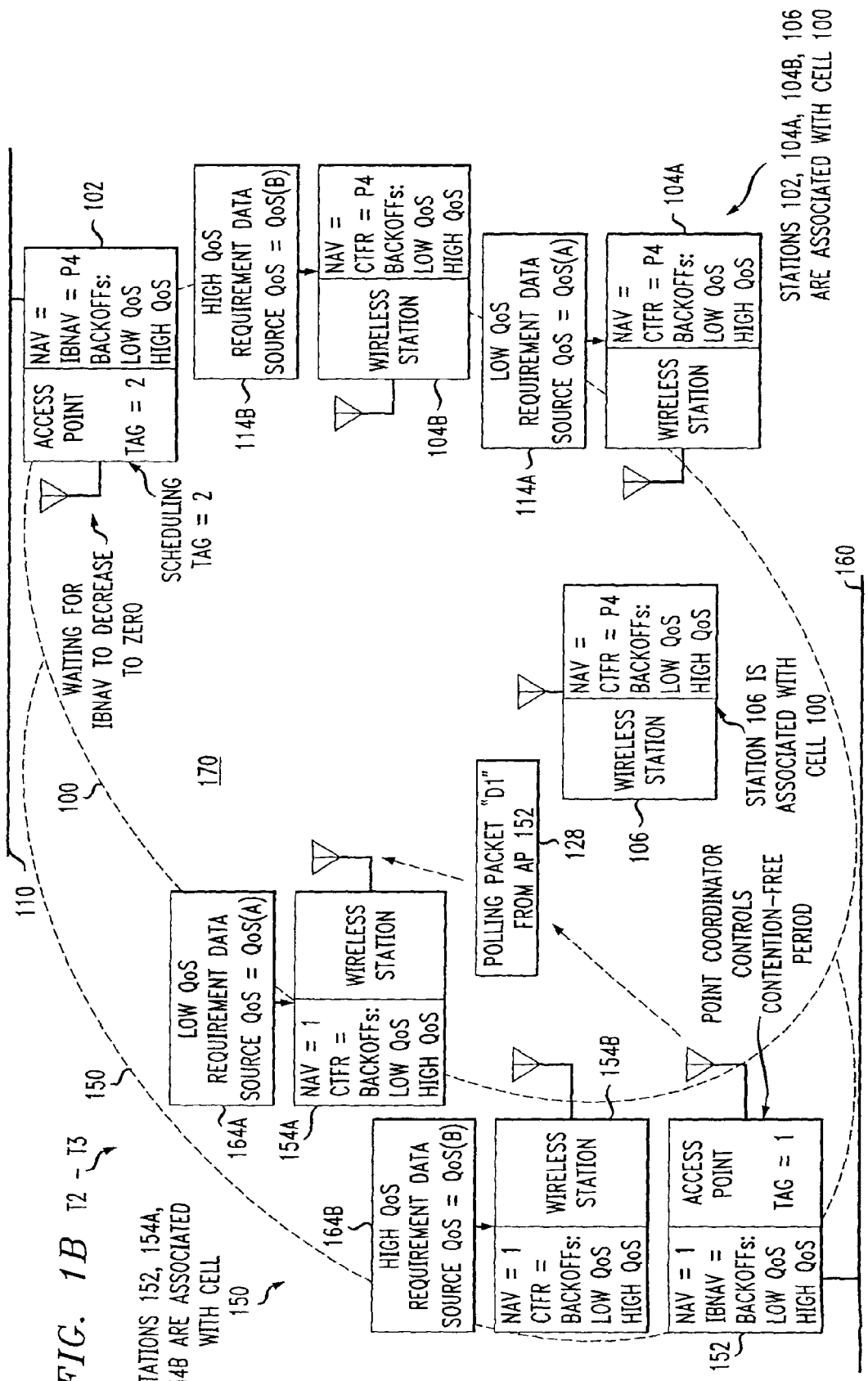
FIG. 1B T2 - T3

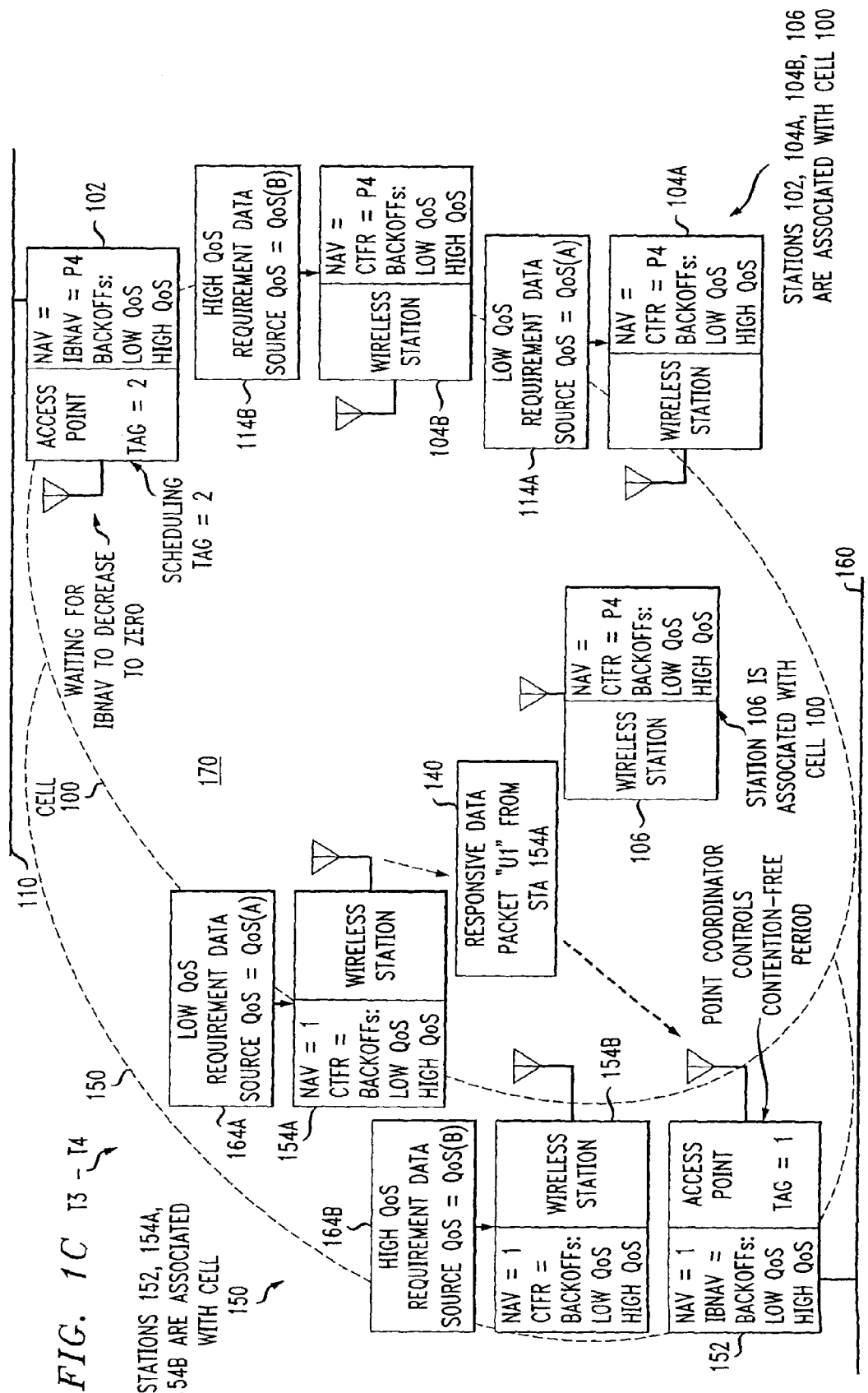

FIG. 1D T4 - T5

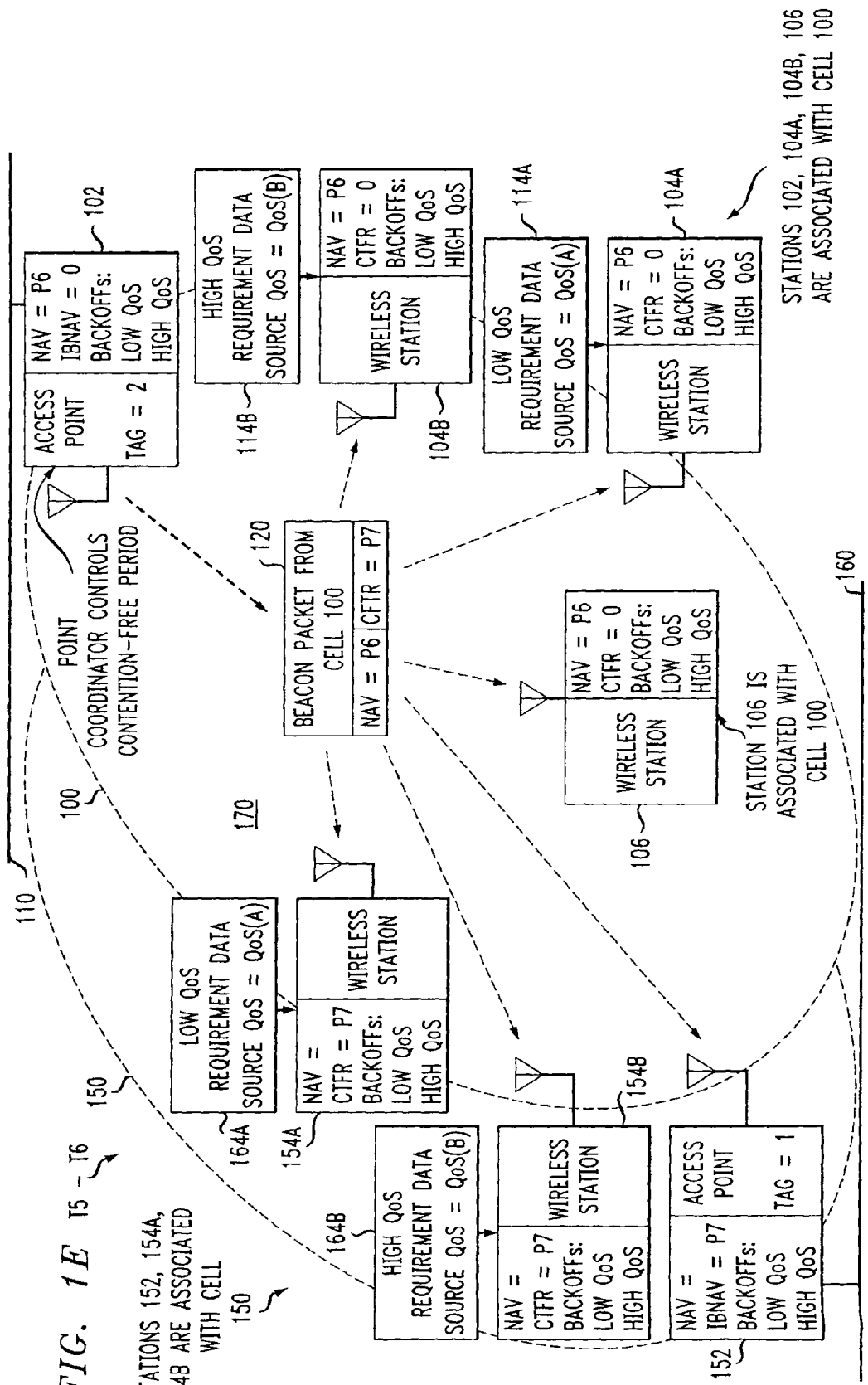

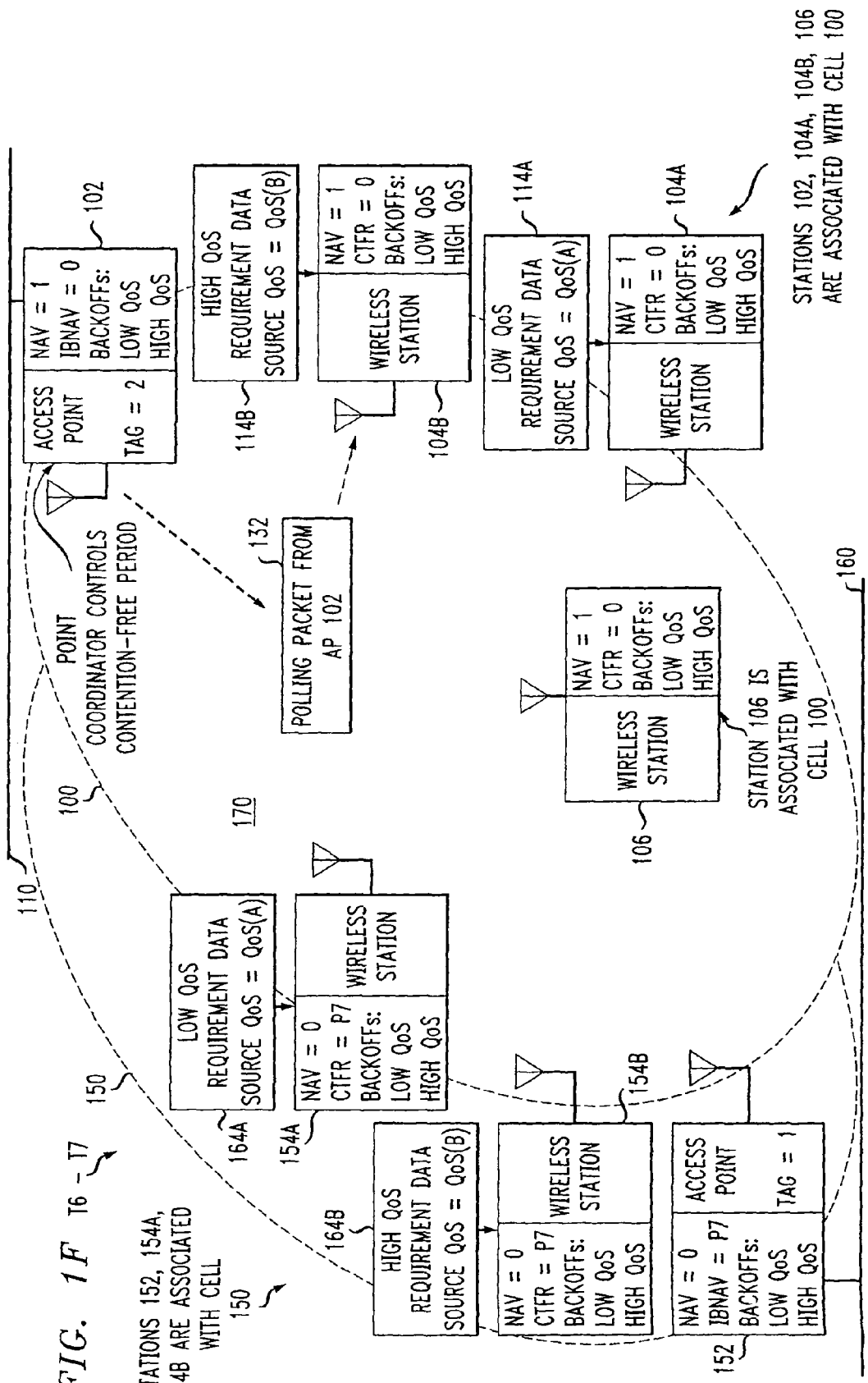

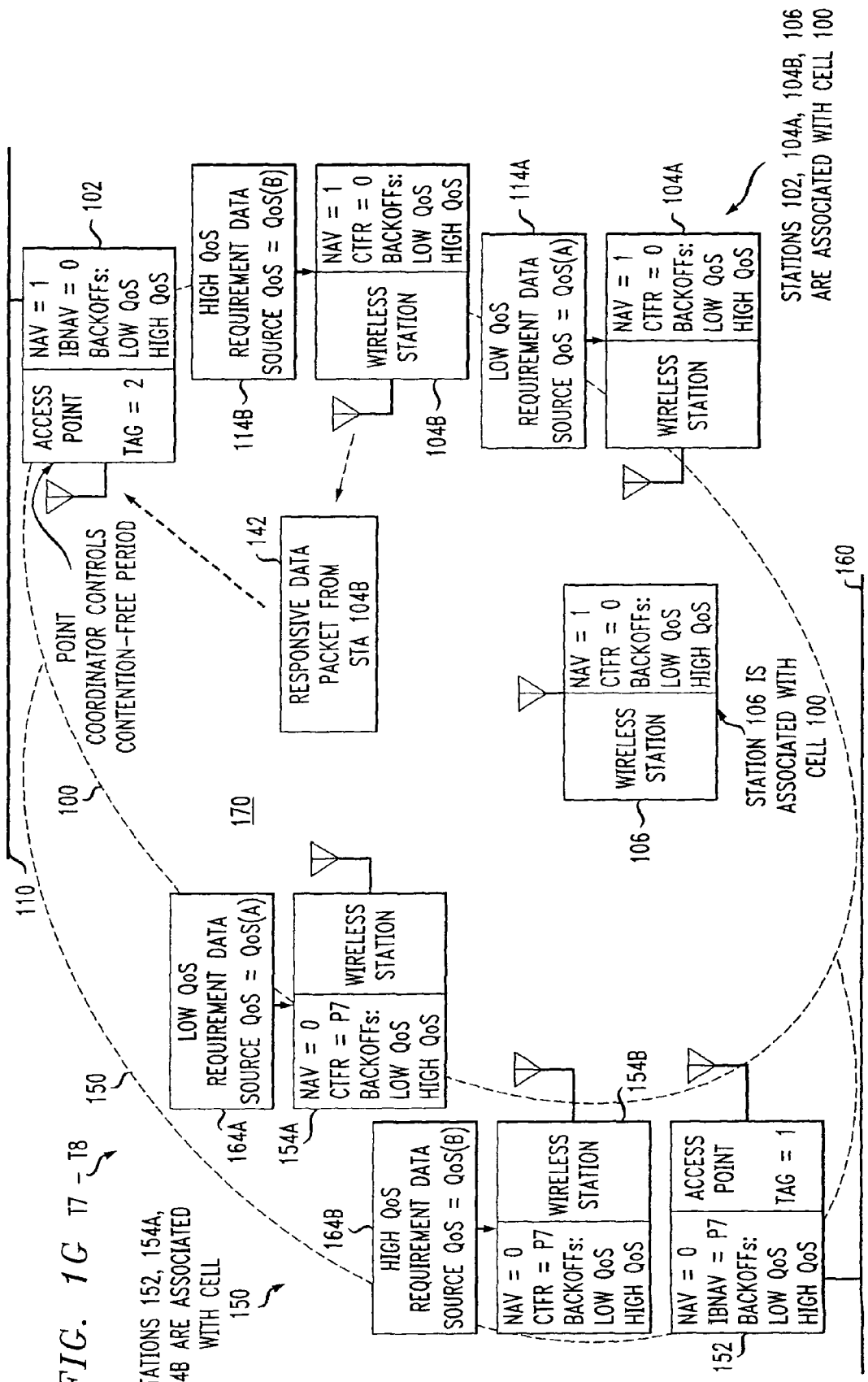

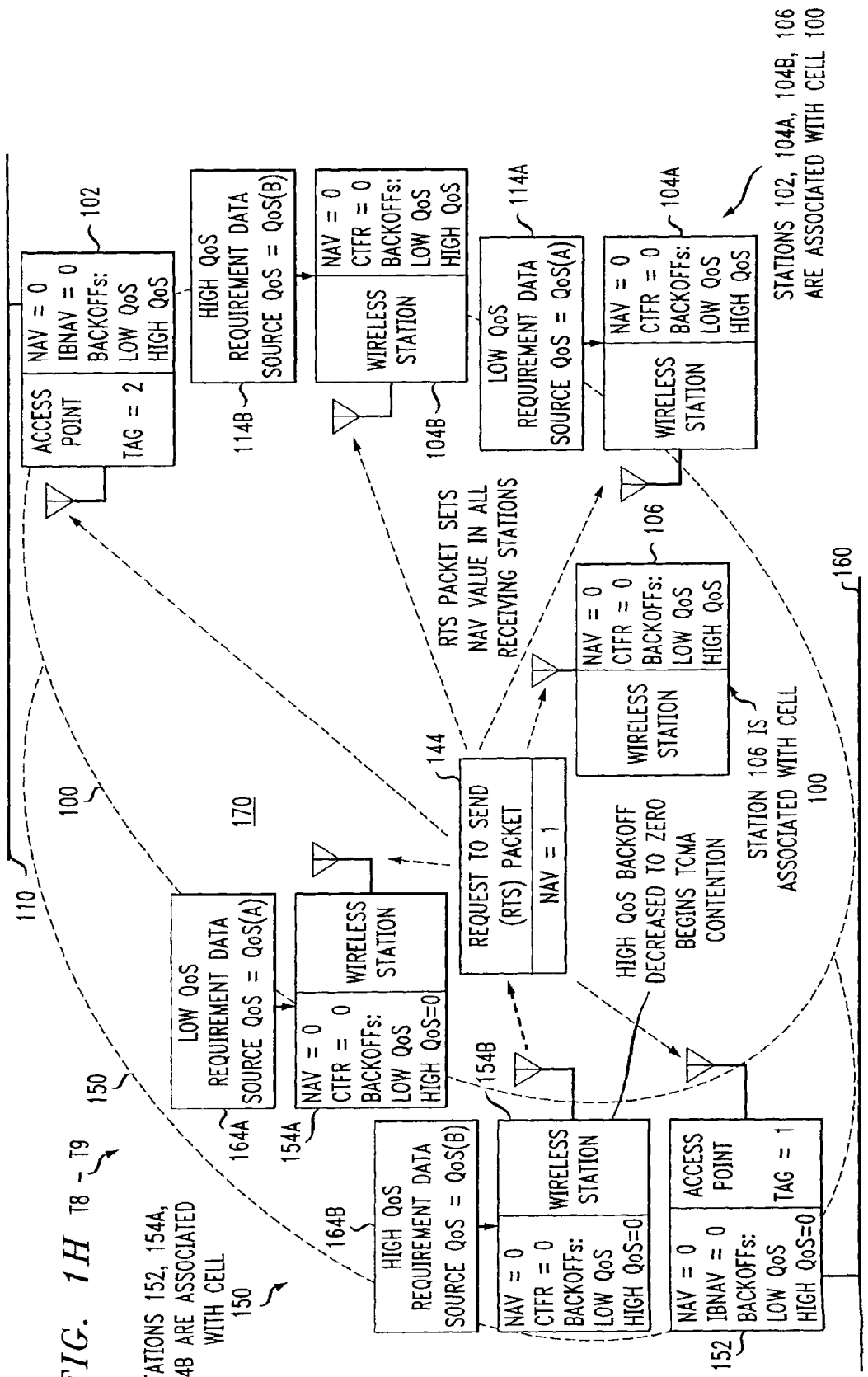
FIG. 1H T8 – T9

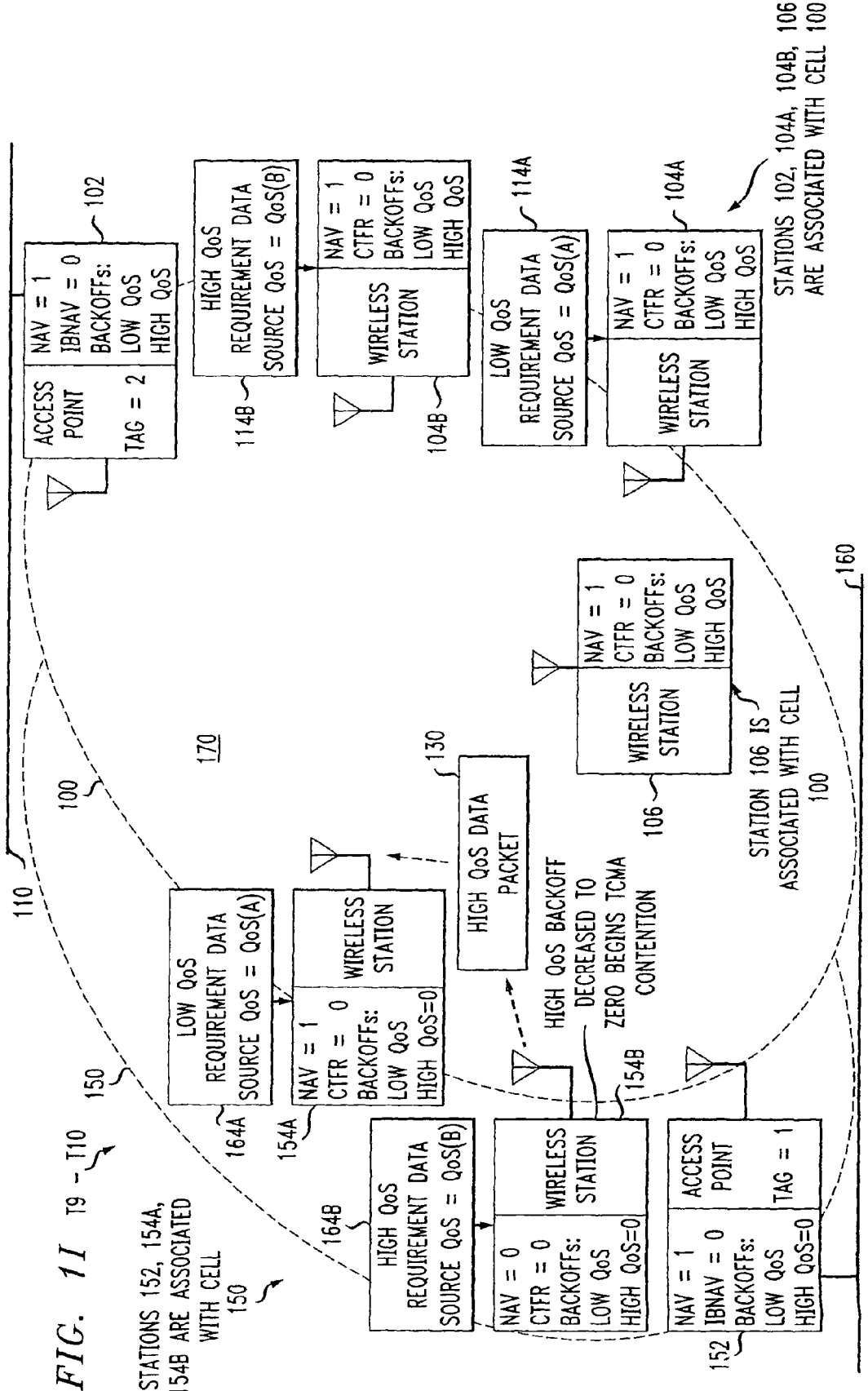
FIG. 1I  T9 – T10

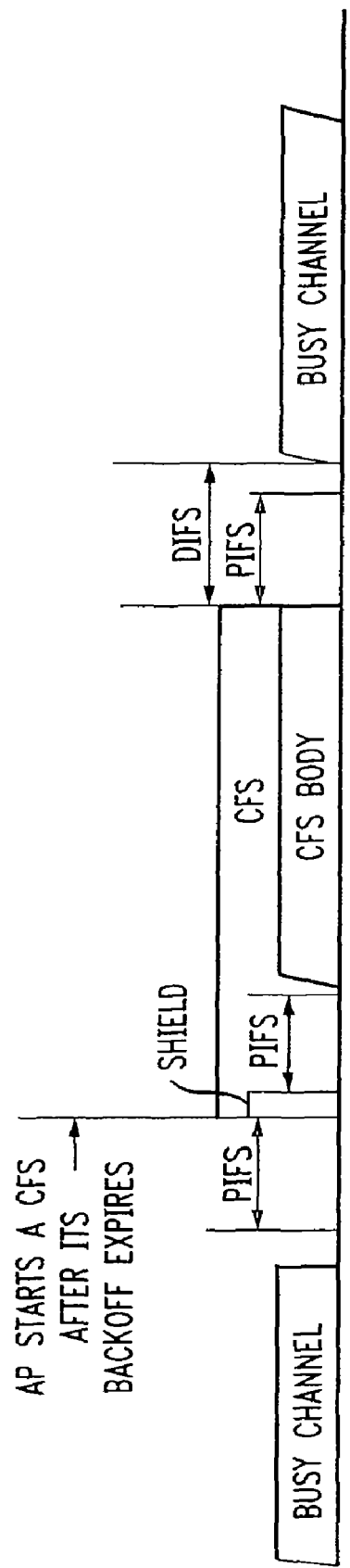

PREEMPTIVE PACKET FOR MAINTAINING CONTIGUITY IN CYCLIC PRIORITIZED MULTIPLE ACCESS (CPMA) CONTENTION-FREE SESSIONS

This application is a continuation of U.S. patent application Ser. No. 10/256,309 filed on Sep. 27, 2002, now U.S. Pat. No. 7,245,605 entitled "PREEMPTIVE PACKET FOR MAINTAINING CONTIGUITY IN CYCLIC PRIORITIZED MULTIPLE ACCESS (CPMA) CONTENTION-FREE SESSIONS" (now allowed), which claims priority from:

[1] U.S. Provisional Patent Application No. 60/330,930, filed Nov. 2, 2001 entitled "HCF ACCESS MECHANISM: OBSS MITIGATION";

[2] U.S. Provisional Patent Application No. 60/331,030, filed Nov. 7, 2001 entitled "'NEIGHBORHOOD' CAPTURE IN CSMA/CA WLANS";

[3] U.S. Provisional Patent Application No. 60/331,211, filed Nov. 13, 2001 entitled "'SHIELD' PROTECTING HIGH PRIORITY CHANNEL ACCESS ATTEMPTS"; and

[4] U.S. Provisional Patent Application No. 60/342,343, filed Dec. 21, 2001 entitled "WIRELESS LANS AND 'NEIGHBORHOOD CAPTURE'," all of which are incorporated herein by reference.

RELATED APPLICATIONS

This patent application is related to the patent application Ser. No. 09/985,257, filed Nov. 2, 2001, by Mathilde Benveniste, entitled "TIERED CONTENTION MULTIPLE ACCESS (TCMA): A METHOD FOR PRIORITY-BASED SHARED CHANNEL ACCESS" (now U.S. Pat. No. 7,095,754), which is incorporated by reference.

This patent application is also related to the copending patent application Ser. No. 10/187,132, filed Jun. 28, 2002, by Mathilde Benveniste, entitled "HYBRID COORDINATION FUNCTION (HCF) ACCESS THROUGH TIERED CONTENTION AND OVERLAPPED WIRELESS CELL MITIGATION", which is incorporated by reference.

This patent application is also related to the copending patent application Ser. No. 10/256,299, filed Sep. 27, 2002, by Mathilde Benveniste, entitled "'SHIELD': PROTECTING HIGH PRIORITY CHANNEL ACCESS ATTEMPTS IN OVERLAPPED WIRELESS CELLS," which is incorporated by reference.

This patent application is also related to the copending patent application Ser. No. 10/256,384, filed Sep. 27, 2002, by Mathilde Benveniste, entitled "WIRELESS LANS AND NEIGHBORHOOD CAPTURE," which is incorporated by reference.

This patent application is also related to the copending patent application Ser. No. 10/256,471, filed Sep. 27, 2002, by Mathilde Benveniste, entitled "STAGGERED STARTUP FOR CYCLIC PRIORITIZED MULTIPLE ACCESS (CPMA) CONTENTION-FREE SESSIONS," which is incorporated by reference.

This patent application is also related to the copending patent application Ser. No. 10/256,305, filed Sep. 27, 2002, by Mathilde Benveniste, entitled "FIXED DETERMINISTIC POST-BACKOFF FOR CYCLIC PRIORITIZED MULTIPLE ACCESS (CPMA) CONTENTION-FREE SESSIONS," which is incorporated by reference.

This patent application is also related to the copending patent application Ser. No. 10/256,516, filed Sep. 27, 2002, by Mathilde Benveniste, entitled "ACCESS METHOD FOR PERIODIC CONTENTION-FREE SESSIONS," which is incorporated by reference.

FIELD OF THE INVENTION

The invention disclosed broadly relates to telecommunications methods and more particularly relates to wireless cells that have overlapping stations contending for the same medium.

BACKGROUND OF THE INVENTION

Wireless Local Area Networks (WLANs)

Wireless local area networks (WLANs) generally operate at peak speeds of between 10 to 100 Mbps and have a typical range of 100 meters. Single-cell wireless LANs are suitable for small single-floor offices or stores. A station in a wireless LAN can be a personal computer, a bar code scanner, or other mobile or stationary device that uses a wireless network interface card (NIC) to make the connection over the RF link to other stations in the network. The single-cell wireless LAN provides connectivity within radio range between wireless stations. An access point allows connections via the backbone network to wired network-based resources, such as servers. A single-cell wireless LAN can typically support up to 25 users and still keep network access delays at an acceptable level. Multiple-cell wireless LANs provide greater range than does a single cell through the means of a set of access points and a wired network backbone to interconnect a plurality of single-cell LANs. Multiple-cell wireless LANs can cover larger, multiple-floor buildings. A mobile laptop computer or data collector with a wireless network interface card (NIC) can roam within the coverage area while maintaining a live connection to the backbone network.

Wireless LAN specifications and standards include the IEEE 802.11 Wireless LAN Standard and the HIPERLAN Type 1 and Type 2 Standards. The IEEE 802.11 Wireless LAN Standard is published in three parts as *IEEE 802.11-1999*, *IEEE 802.11a-1999*, and *IEEE 802.11b-1999*, which are available from the IEEE, Inc. web site http://grouper.ieee.org/groups/802/11. An overview of the HIPERLAN Type 1 principles of operation is provided in the publication *HIPERLAN Type 1 Standard*, ETSI ETS 300 652, WA2 December 1997. An overview of the HIPERLAN Type 2 principles of operation is provided in the Broadband Radio Access Network's (BRAN) *HIPERLAN Type 2; System Overview*, ETSI TR 101 683 VI.I.1 (2000-02), and a more detailed specification of its network architecture is described in *HIPERLAN Type 2, Data Link Control (DLC) Layer; Part 4. Extension for Home Environment*, ETSI TS 101 761-4 V1.2.1 (2000-12). A subset of wireless LANs is Wireless Personal Area Networks (PANs), of which the Bluetooth Standard is the best known. The Bluetooth Special Interest Group, *Specification Of The Bluetooth System*, Version 1.1, Feb. 22, 2001, describes the principles of Bluetooth device operation and communication protocols.

The IEEE 802.11 Wireless LAN Standard defines at least two different physical (PHY) specifications and one common medium access control (MAC) specification. The IEEE 802.11(a) Standard is designed to operate in unlicensed portions of the radio spectrum, usually either in the 2.4 GHz Industrial, Scientific, and Medical (ISM) band or the 5 GHz Unlicensed-National Information Infrastructure (U-NII) band. It uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 networks can also have an independent configuration where the mobile stations communicate directly with one another, without support from a fixed access point.

A single-cell wireless LAN using the IEEE 802.11 Wireless LAN Standard is an Independent Basic Service Set (IBSS) network. An IBSS has an optional backbone network and consists of at least two wireless stations. A multiple-cell wireless LAN using the IEEE 802.11 Wireless LAN Standard is an Extended Service Set (ESS) network. An ESS satisfies the needs of large coverage networks of arbitrary size and complexity.

Each wireless station and access point in an IEEE 802.11 wireless LAN implements the MAC layer service, which provides the capability for wireless stations to exchange MAC frames. The MAC frame transmits management, control, or data between wireless stations and access points. After a station forms the applicable MAC frame, the frame's bits are passed to the Physical Layer for transmission.

Before transmitting a frame, the MAC layer must first gain access to the network. Three interframe space (IFS) intervals defer an IEEE 802.11 station's access to the medium and provide various levels of priority. Each interval defines the duration between the end of the last symbol of the previous frame and the beginning of the first symbol of the next frame. The Short Interframe Space (SIFS) provides the highest priority level by allowing some frames to access the medium before others, such as an Acknowledgement (ACK) frame, a Clear-to-Send (CTS) frame, or a subsequent fragment burst of a previous data frame. These frames require expedited access to the network to minimize frame retransmissions.

The Priority Interframe Space (PIFS) is used for high-priority access to the medium during the contention-free period. A point coordinator in the access point connected to the backbone network controls the priority-based Point Coordination Function (PCF) to dictate which stations in the cell can gain access to the medium. The point coordinator in the access point sends a contention-free poll frame to a station, granting the station permission to transmit a single frame to any destination. All other stations in the cell can only transmit during a contention-free period if the point coordinator grants them access to the medium. The end of the contention-free period is signaled by the contention-free end frame sent by the point coordinator, which occurs when time expires or when the point coordinator has no further frames to transmit and no stations to poll. The Priority Interframe Space (PIFS) is also known as the PCF Interframe Space.

The distributed coordination function (DCF) Interframe Space (DIFS) is used for transmitting low-priority data frames during the contention-based period. The DIFS spacing delays the transmission of lower-priority frames to occur later than the priority-based transmission frames. An Extended Interframe Space (EIFS) goes beyond the time of a DIFS interval, as a waiting period when a bad reception occurs. The EIFS interval provides enough time for the receiving station to send an acknowledgment (ACK) frame.

During the contention-based period, the distributed coordination function (DCF) uses the Carrier-Sense Multiple Access With Collision Avoidance (CSMA/CA) contention-based protocol, which is similar to IEEE 802.3 Ethernet. The CSMA/CA protocol minimizes the chance of collisions between stations sharing the medium by waiting a random backoff interval if the station's sensing mechanism indicates a busy medium. The period of time a minimal interval following traffic on the medium is when the highest probability of collisions occurs, especially where there is high utilization. Once the medium is idle, CSMA/CA protocol causes each station to delay its transmission by a random backoff time, thereby minimizing the chance it will collide with those from other stations.

The CSMA/CA protocol computes the random backoff time as the product of a constant, the slot time, times a pseudo-random number RN that has a range of values from zero to a collision window CW. The value of the collision window for the first try to access the network is CW1, which yields the first-try random backoff time. If the first try to access the network by a station fails, then the CSMA/CA protocol computes a new CW by doubling the current value of CW as CW2=CW1 times 2. The value of the collision window for the second try to access the network is CW2, which yields the second-try random backoff time. This process by the CSMA/CA protocol of increasing the delay before transmission is called binary exponential backoff. The reason for increasing CW is to minimize collisions and maximize throughput for both low and high network utilization. Where there is a low network utilization, stations are not forced to wait very long before transmitting their frame. On the first or second attempt, a station will make a successful transmission. However, if the utilization of the network is high, the CSMA/CA protocol delays stations for longer periods to avoid the chance of multiple stations transmitting at the same time. If the second try to access the network fails, then the CSMA/CA protocol computes a new CW by again doubling the current value of CW as CW3=CW1 times 4. The value of the collision window for the third try to access the network is CW3, which yields the third-try random backoff time. The value of CW increases to relatively high values after successive retransmissions under high traffic loads. This provides greater transmission spacing between stations waiting to transmit.

Collision Avoidance Techniques

Four general collision avoidance approaches have emerged: [1] Carrier Sense Multiple Access (CSMA) [see, F. Tobagi and L. Kleinrock, "Packet Switching in Radio Channels: Part I—Carrier Sense Multiple Access Models and their Throughput Delay Characteristics," *IEEE Transactions on Communications*, Vol. 23, No. 12, pp. 1400-1416, 1975], [2] Multiple Access Collision Avoidance (MACA) [see, P. Karn, "MACA—A New Channel Access Protocol for Wireless Ad-Hoc Networks," *Proceedings of the ARRL/CRRL Amateur Radio Ninth Computer Networking Conference*, pp. 134-140, 1990.], [3] their combination CSMA/CA, and [4] collision avoidance tree expansion.

CSMA allows access attempts after sensing the channel for activity. Still, simultaneous transmit attempts lead to collisions, thus rendering the protocol unstable at high traffic loads. The protocol also suffers from the hidden terminal problem.

The latter problem was resolved by the Multiple Access Collision Avoidance (MACA) protocol, which involves a three-way handshake. [P. Karn, supra.] The origin node sends a request to send (RTS) notice of the impending transmission. A response is returned by the destination if the RTS notice is received successfully, and the origin node proceeds with the transmission. This protocol also reduces the average delay as collisions are detected upon transmission of merely a short message, the RTS. With the length of the packet included in the RTS and echoed in the clear-to-send (CTS) messages, hidden terminals can avoid colliding with the transmitted message. However, this prevents the back-to-back re-transmission in case of unsuccessfully transmitted packets. A five-way handshake Multiple Access Collision Avoidance (MACA) protocol provides notification to competing sources of the successful termination of the transmission. [See, V. Bharghavan, A. Demers, S. Shenker, and L. Zhang, "MACAW: A media access protocol for wireless LANs," *SIGCOMM '94*, pp. 212-225, ACM, 1994.]

CSMA and MACA are combined in CSMA/CA, which is MACA with carrier sensing, to give better performance at high loads. A four-way handshake is employed in the basic contention-based access protocol used in the Distributed Coordination Function (DCF) of the IEEE 802.11 Standard for Wireless LANS. [See, IEEE Standards Department, D3, "Wireless Medium Access Control and Physical Layer WG," *IEEE Draft Standard P*802.11 *Wireless LAN*, January 1996.]

Collisions can be avoided by splitting the contending terminals before transmission is attempted. In the pseudo-Bayesian control method, each terminal determines whether it has permission to transmit using a random number generator and a permission probability "p" that depends on the estimated backlog. [See, R. L. Rivest, "Network control by Bayesian Broadcast," *IEEE Trans. Inform. Theory*, Vol. IT 25, pp. 505-515, September 1979.]

To resolve collisions, subsequent transmission attempts are typically staggered randomly in time using the following two approaches: binary tree and binary exponential backoff.

Upon collision, the binary tree method requires the contending nodes to self-partition into two groups with specified probabilities. This process is repeated with each new collision. The order in which contending nodes transmit is determined either by serial or parallel resolution of the tree. [See, J. L. Massey, "Collision-Resolution Algorithms and Random-Access Communications," in *Multi-User Communication Systems*, G. Longo (ed.), CISM Courses and Lectures No. 265, New York: Springer 1982, pp. 73-137.]

In the binary exponential backoff approach, a backoff counter tracks the number of pauses and hence the number of completed transmissions before a node with pending packets attempts to seize the channel. A contending node initializes its backoff counter by drawing a random value, given the backoff window size. Each time the channel is found idle, the backoff counter is decreased and transmission is attempted upon expiration of the backoff counter. The window size is doubled every time a collision occurs, and the backoff countdown starts again. [See, A. Tanenbaum, *Computer Networks*, 3$^{rd}$ ed., Upper Saddle River, N.J., Prentice Hall, 1996.] The Distributed Coordination Function (DCF) of the IEEE 802.11 Standard for Wireless LANs employs a variant of this contention-resolution scheme: a truncated binary exponential backoff, starting at a specified window and allowing up to a maximum backoff range below which transmission is attempted. [IEEE Standards Department, D3, supra.] Different backoff counters may be maintained by a contending node for traffic to specific destinations. [Bharghavan, supra.]

In the IEEE 802.11 Standard, the channel is shared by a centralized access protocol, the Point Coordination Function (PCF), which provides contention-free transfer based on a polling scheme controlled by the access point (AP) of a basic service set (BSS). [IEEE Standards Department, D3, supra.] The centralized access protocol gains control of the channel and maintains control for the entire contention-free period by waiting a shorter time between transmissions than the stations using the Distributed Coordination Function (DCF) access procedure. Following the end of the contention-free period, the DCF access procedure begins, with each station contending for access using the CSMA/CA method.

The 802.11 MAC Layer provides both contention and contention-free access to the shared wireless medium. The MAC Layer uses various MAC frame types to implement its functions of MAC management, control, and data transmission. Each station and access point on an 802.11 wireless LAN implements the MAC Layer service, which enables stations to exchange packets. The results of sensing the channel to determine whether the medium is busy or idle are sent to the MAC coordination function of the station. The MAC coordination also carries out a virtual carrier sense protocol based on reservation information found in the Duration Field of all frames. This information announces to all other stations the sending station's impending use of the medium. The MAC coordination monitors the Duration Field in all MAC frames and places this information in the station's Network Allocation Vector (NAV) if the value is greater than the current NAV value. The NAV operates similarly to a timer, starting with a value equal to the Duration Field of the last frame transmission sensed on the medium and counting down to zero. After the NAV reaches zero, the station can transmit if its physical sensing of the channel indicates a clear channel.

At the beginning of a contention-free period, the access point senses the medium; and if it is idle, it sends a beacon packet to all stations. The beacon packet contains the length of the contention-free interval. The MAC coordination in each member station places the length of the contention-free interval in the station's Network Allocation Vector (NAV), which prevents the station from taking control of the medium until the end of the contention-free period. During the contention-free period, the access point can send a polling message to a member station, enabling it to send a data packet to any other station in the BSS wireless cell.

Quality Of Service (QoS)

Quality of service (QoS) is a measure of service quality provided to a customer. The primary measures of QoS are message loss, message delay, and network availability. Voice and video applications have the most rigorous delay and loss requirements. Interactive data applications such as Web browsing have less restrained delay and loss requirements, but they are sensitive to errors. Non-real-time applications such as file transfer, email, and data backup operate acceptably across a wide range of loss rates and delay. Some applications require a minimum amount of capacity to operate at all—for example, voice and video. Many network providers guarantee specific QoS and capacity levels through the use of Service-Level Agreements (SLAs). An SLA is a contract between an enterprise user and a network provider that specifies the capacity to be provided between points in the network that must be delivered with a specified QoS. If the network provider fails to meet the terms of the SLA, then the user may be entitled a refund. The SLA is typically offered by network providers for private line, frame relay, ATM, or Internet networks employed by enterprises.

The transmission of time-sensitive and data application traffic over a packet network imposes requirements on the delay or delay jitter, and the error rates realized; these parameters are referred to generically as the QoS (Quality of Service) parameters. Prioritized packet scheduling, preferential packet dropping, and bandwidth allocation are among the techniques available at the various nodes of the network, including access points, that enable packets from different applications to be treated differently, helping achieve the different quality of service objectives. Such techniques exist in centralized and distributed variations.

Management of contention for the shared transmission medium must reflect the goals sought for the performance of the overall system. For instance, one such goal would be the maximization of goodput (the amount of good data transmitted as a fraction of the channel capacity) for the entire system, or of the utilization efficiency of the RF spectrum; another is the minimization of the worst-case delay. As multiple types of traffic with different performance requirements are combined into packet streams that compete for the same transmission medium, a multi-objective optimization is required.

Ideally, one would want a multiple-access protocol that is capable of effecting packet transmission scheduling as close to the optimal scheduling as possible, but with distributed control. Distributed control implies both some knowledge of the attributes of the competing packet sources and limited control mechanisms.

To apply any scheduling algorithm in random multiple access, a mechanism must exist that imposes an order in which packets will seize the medium. For distributed control, this ordering must be achieved independently, without any prompting or coordination from a control node. Only if there is a reasonable likelihood that packet transmissions will be ordered according to the scheduling algorithm can one expect that the algorithm's proclaimed objective will be attained.

The above-cited, copending patent application by Mathilde Benveniste, entitled "Tiered Contention Multiple Access (TCMA): A Method for Priority-Based Shared Channel Access", describes the Tiered Contention Multiple Access (TCMA) distributed medium access protocol that schedules transmission of different types of traffic based on their QoS service quality specifications. This protocol makes changes to the contention window following the transmission of a frame, and therefore is also called Extended-DCF (E-DCF). During the contention window, the various stations on the network contend for access to the network. To avoid collisions, the MAC protocol requires that each station first wait for a randomly chosen time period, called an arbitration time. Since this period is chosen at random by each station, there is less likelihood of collisions between stations. TCMA uses the contention window to give higher priority to some stations than to others. Assigning a short contention window to those stations that should have higher priority ensures that, in most cases, the higher-priority stations will be able to transmit ahead of the lower-priority stations. TCMA schedules transmission of different types of traffic based on their QoS service quality specifications. A station cannot engage in backoff countdown until the completion of an idle period of length equal to its arbitration time.

The above-cited, copending patent application by Mathilde Benveniste also applies TCMA to the use of the wireless access point as a traffic director. This application of the TCMA protocol is called the hybrid coordination function (HCF). In HCF, the access point uses a polling technique as the traffic control mechanism. The access point sends polling packets to a succession of stations on the network. The individual stations can reply to the poll with a packet that contains not only the response, but also any data that needs to be transmitted. Each station must wait to be polled. The access point establishes a polling priority based on the QoS priority of each station.

What is needed in the prior art is a way to reduce interference between overlapping first and second wireless LAN cells contending for the same medium.

SUMMARY OF THE INVENTION

In accordance with the invention, an access point transmits a preemptive peg packet when it has no data to transmit in order to maintain the contiguity of its transmission timing position with respect to the timing position of other contention-free sessions (CFS) transmitted by other access points in an existing, periodic sequence. The cyclic prioritized multiple access (CPMA) method establishes the transmission timing position of contention-free sessions (CFS) between overlapping first and second wireless LAN cells contending for the same medium. Each cell includes a respective plurality of member stations. If an access point has no traffic, it will transmit a short, preemptive pegging packet and reset its backoff timer. In this manner, no gaps longer than the distributed coordination function (DCF) Interframe Space (DIFS) are left idle. This prevents other stations from using DCF contention to seize the channel, until all access points have completed one contention-free session (CFS) per periodic cycle.

DESCRIPTION OF THE FIGURES

FIGS. 1 through 1I show the interaction of two wireless LAN cells which have overlapping access points contending for the same medium, in accordance with the invention.

FIG. 3 illustrates a timing diagram for the transmission of the shield packet.

DISCUSSION OF THE PREFERRED EMBODIMENT

Figure 1:
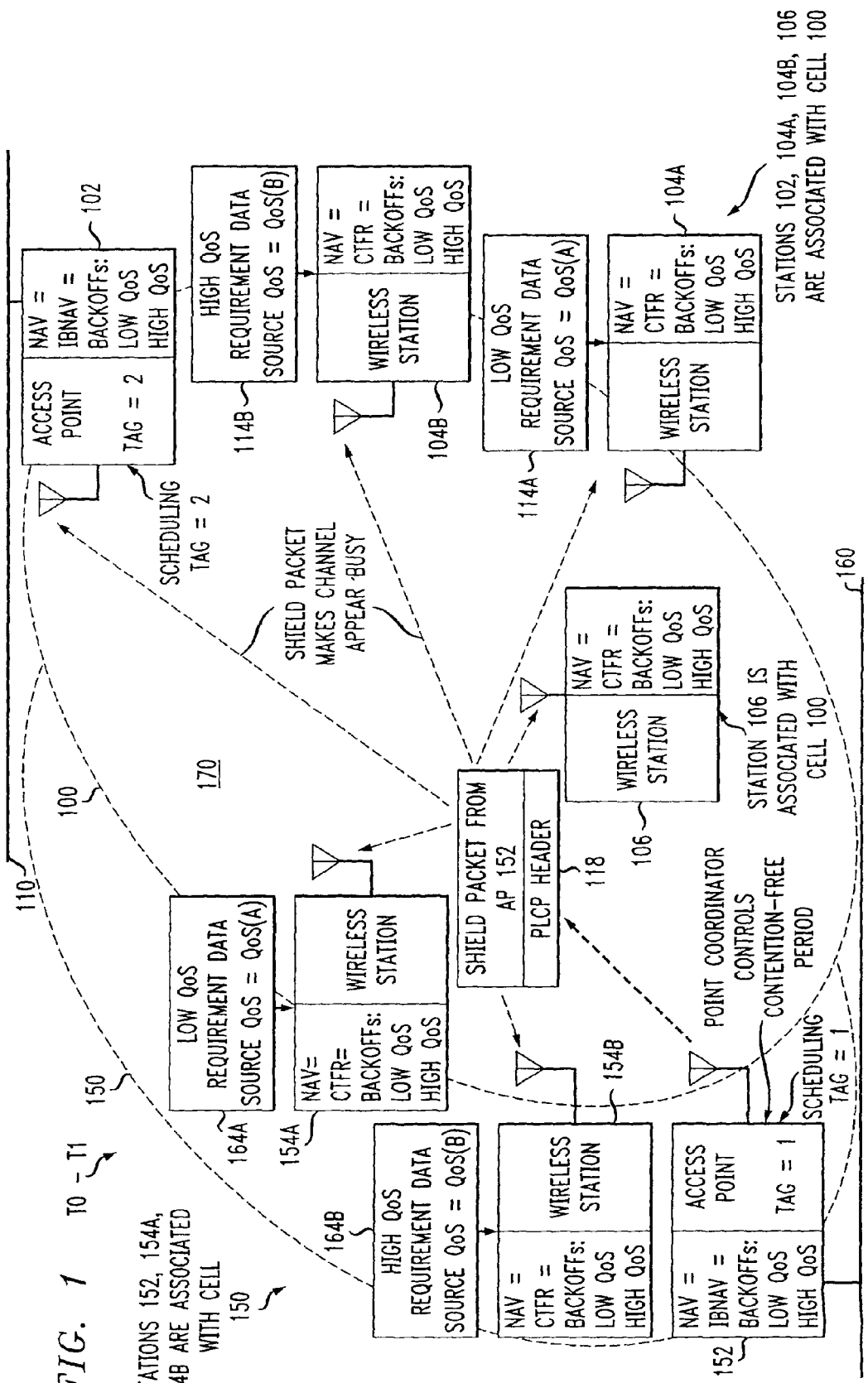

The invention disclosed broadly relates to telecommunications methods and more particularly relates to wireless cells that have overlapping stations contending for the same medium. An inter-cell contention-free period value is assigned to a first access point station in the first cell, associated with an accessing order in the medium for member stations in the first and second cells. The access point in the first cell transmits an initial shield packet to deter other stations from contending for the medium. The access point then transmits a beacon packet containing the inter-cell contention-free period value to member stations in the second cell. A second access point in the second cell can then delay transmissions by member stations in the second cell until after the inter-cell contention-free period expires. The beacon packet sent by the first access point station also includes an intra-cell contention-free period value, which causes the member stations in the first cell to delay accessing the medium until polled by the first access point. After the expiration of the intra-cell contention-free period, member stations in the first cell may contend for the medium based on the quality of service (QoS) data they are to transmit, using the Tiered Contention Multiple Access (TCMA) protocol.

Tiered Contention Multiple Access (TCMA) protocol is applied to wireless cells which have overlapping access points contending for the same medium. Quality of service (QoS) support is provided to overlapping access points to schedule transmission of different types of traffic based on the service quality specifications of the access points. A description of Tiered Contention Multiple Access (TCMA) protocol applied to overlapping wireless cells is provided in the following two copending U.S. Patent Applications, which are incorporated herein by reference: Ser. No. 09/985,257, filed Nov. 2, 2001, by Mathilde Benveniste, entitled "Tiered Contention Multiple Access (TCMA): A Method For Priority-Based Shared Channel Access;" and Ser. No. 10/187,132, filed Jun. 28, 2002, by Mathilde Benveniste, entitled "Hybrid Coordination Function (HCF) Access Through Tiered Contention And Overlapped Wireless Cell Mitigation."

The method assigns a first scheduling tag to a first access point station in a first wireless LAN cell. The scheduling tag has a value that determines an accessing order for the cell in a transmission frame, with respect to the accessing order of other wireless cells. The scheduling tag value is deterministically set. The scheduling tag value can be permanently assigned to the access point by its manufacturer; it can be assigned by the network administrator at network startup; it can be assigned by a global processor that coordinates a plurality of wireless cells over a backbone network, it can be drawn from a pool of possible tag values during an initial handshake negotiation with other wireless stations; or it can be cyclically permuted in real-time, on a frame-by-frame basis, from a pool of possible values, coordinating that cyclic permutation with that of other access points in other wireless cells.

Figure 2B:
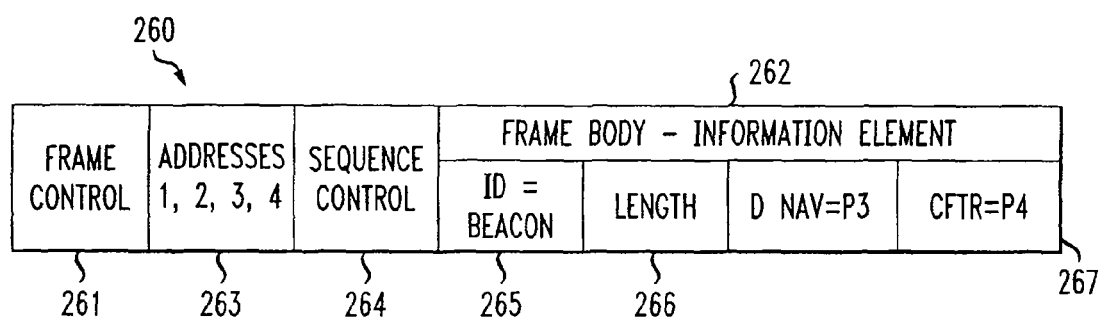
FIG. 2B shows the IEEE 802.11 packet structure for a beacon packet, including the increment to the NAV period and the CFTR period.
Figure 2A:
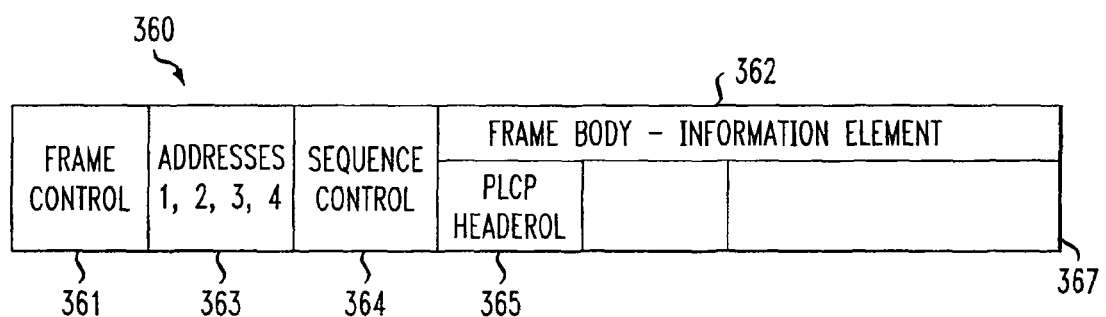
FIG. 2A shows the IEEE 802.11 packet structure for a Shield packet, in accordance with the invention.
Figure 4:
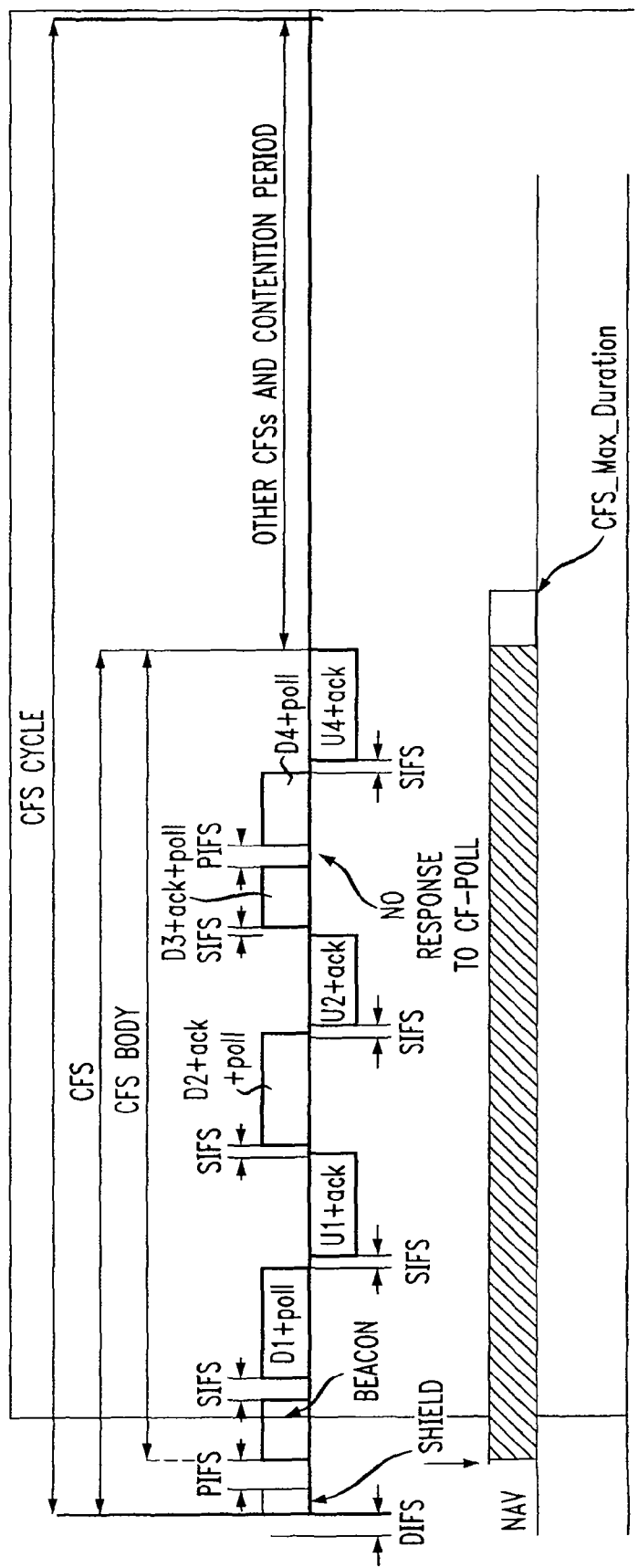
FIG. 4 shows a timing diagram of a sample contention-free session (CFS) structure, which includes the shield packet, the beacon packet, and the exchange of data packets during the contention-free period shown in FIGS. 1, 1A through 1C.

An access point station 152 in wireless cell 150 is connected to backbone network 160 in FIG. 1. The access point 152 signals the beginning of an intra-cell contention-free session (CFS) of FIGS. 3 and 4 for member stations 154A and 154B in its cell by transmitting a shield packet 118, during the period from T0 to T1. The shield packet 118 or 119 is a short packet, such as a Physical Layer Convergence Procedure (PLCP) header without the MAC data, as shown in FIG. 2A. The shield packet 118 makes the wireless channel appear busy to any station receiving the shield packet. This includes not only the member stations 154A and 154B in cell 150, but also any stations in another overlapped cell, such as cell 100. Access point 10s and the stations 104A, 104B, and 106 of the overlapped cell 100 also receive the shield packet 118. All such stations listen to the channel and when they receive the shield packet 118, they defer transmitting on what they perceive to be a busy channel. The transmitting access point 152 is thus assured that no other station will begin contending for the medium while the access point 152 is sending a beacon packet in the next step, shown in FIG. 1A. A timing diagram for the transmission of the shield packet to begin the intra-cell contention-free session (CFS) is shown in FIGS. 3 and 4.

FIG. 2A shows the IEEE 802.11 packet structure 360 for a shield packet 118. The shield packet structure 360 includes fields 361 to 367. Field 365 is the PLCP header and field 367 is the empty frame body.

FIG. 1A shows the access point 152 of cell 150 transmitting the beacon packet 124 during the period from T1 to T2. The beacon packet 124, shown in FIG. 2B, includes two contention-free period values. The first is the Network Allocation Vector (NAV) (or alternately its incremental value ΔNAV), which specifies a period value P3 for the intra-cell contention-free period (CFP) for member stations in its own cell 150. The intra-cell contention-free period (CFP) is the duration of the contention-free session (CFS) shown in FIG. 4. Member stations within the cell 150 must wait for the period P3 before beginning the Tiered Contention Multiple Access (TCMA) procedure. The other contention-free period value included in the beacon packet 124 is the Inter-BSS Network Allocation Vector (IBNAV), which specifies the contention-free time response (CFTR) period P4. The contention-free time response (CFTR) period P4 gives notice to any other cell receiving the beacon packet, such as cell 100, that the first cell 150 has seized the medium for the period of time represented by the value P4. A timing diagram for the transmission of the beacon packet is shown in FIG. 4.

The beacon packet 124 is received by the member stations 154A (with a low QoS requirement 164A) and 154B (with a high QoS requirement 164B) in the cell 150 during the period from T1 to T2. The member stations 154A and 154B store the value of ΔNAV=P3 and begin counting down that value during the contention free period of the cell 150. The duration of the intra-cell contention-free period ΔNAV=P3 is deterministically set. The member stations in the cell store the intra-cell contention-free period value P3 as the Network Allocation Vector (NAV). Each member station in the cell 150 decrements the value of the NAV in a manner similar to other backoff time values, during which it will delay accessing the medium. FIG. 2B shows the IEEE 802.11 packet structure 260 for the beacon packet 124 or 120, including the increment to the NAV period and the CFTR period. The value P4 specifies the Inter-BSS Network Allocation Vector (IBNAV), i.e., the contention-free time response (CFTR) period that the second access point 102 must wait, while the first cell 150 has seized the medium. The beacon packet structure 260 includes fields 261 to 267. Field 267 specifies the ΔNAV value of P3 and the CFTR value of P4. The method assigns to the first access point station a first inter-cell contention-free period value, which gives notice to any other cell receiving the beacon packet that the first cell has seized the medium for the period of time represented by the value. The inter-cell contention-free period value is deterministically set.

If the cells 100 and 150 are mostly overlapped, as in region 170 shown in FIG. 1A, then transmissions from any one station in one cell 150 will be received by most or all stations in the overlapped cell 100. The beacon packet 124 transmitted by the access point 152 in cell 150 is received by all of the stations in cell 150 and all of the stations in cell 100, in FIG. 1A.

Alternately, if only one or a small portion of stations are in the region of overlap 170, then a contention-free time response (CFTR) packet will be used to relay the information in the beacon packet to those stations remote from the transmitting station. The description of the CFTR packet and its operation is provided in the copending U.S. patent application Ser. No. 10/187,132, filed Jun. 28, 2002, by Mathilde Benveniste, entitled "Hybrid Coordination Function (HCF)

Access Through Tiered Contention And Overlapped Wireless Cell Mitigation," incorporated herein by reference. For a partially overlapped region 170, any station receiving the beacon packet 124 immediately rebroadcasts a contention-free time response (CFTR) packet containing a copy of the first inter-cell contention-free period value P4. The value P4 specifies the Inter-BSS Network Allocation Vector (IBNAV), i.e., the contention-free time response (CFTR) period that the second access point 102 must wait while the first cell 150 has seized the medium. In this manner, the notice is distributed to the second access point station 102 in the overlapping, second cell 100.

Figure 1D:
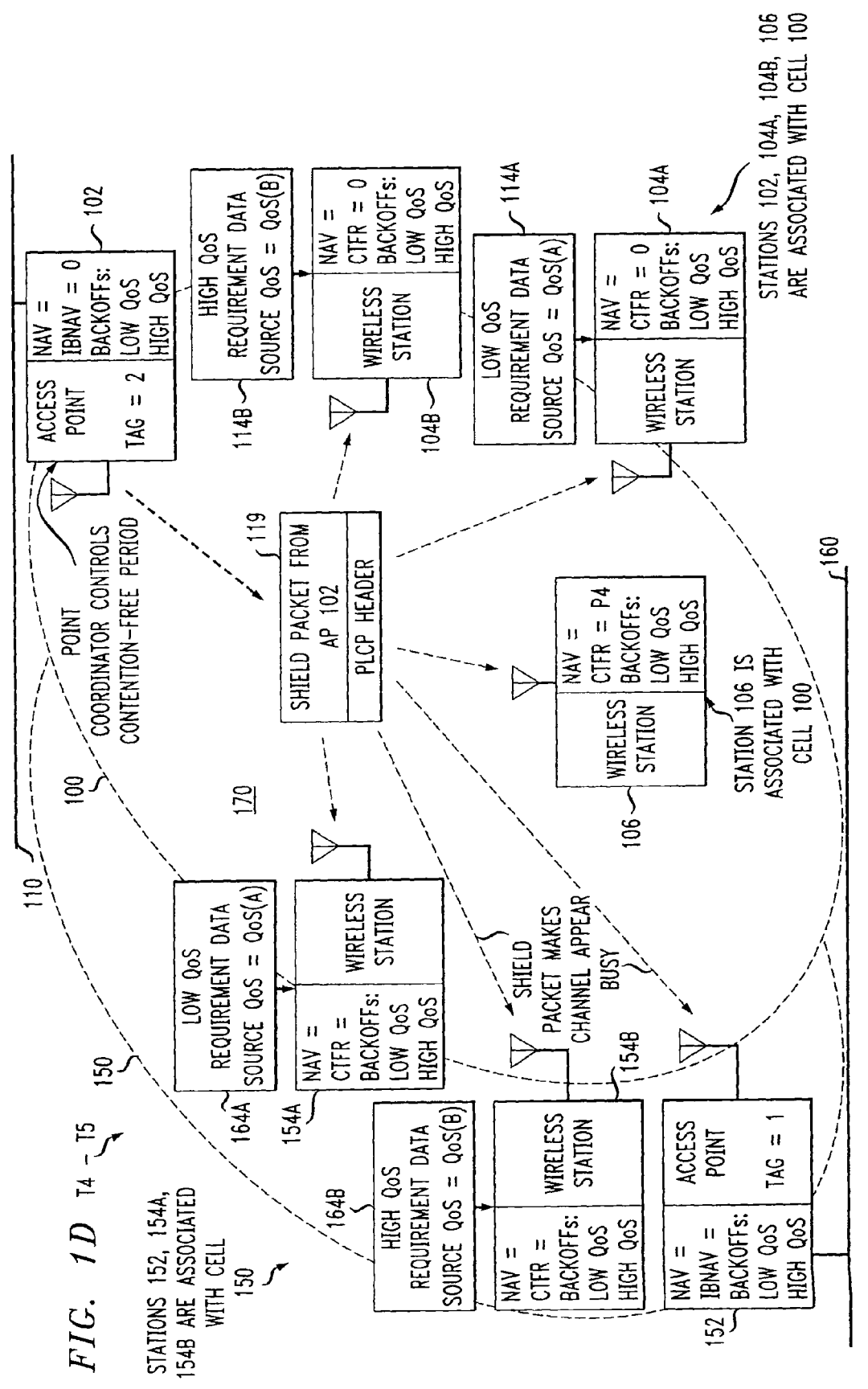

FIG. 1B shows the point coordinator in access point 152 of cell 150 controlling the contention-free period within the cell 150 by using the polling packet "D1" 128 during the period from T2 to T3. A timing diagram for the transmission of the polling packet is shown in FIG. 4. In the mean time, the second access point 102 in the second cell 100 connected to backbone network 110 stores the first inter-cell contention-free period value P4 received in the CFTR packet 126, which it stores as the Inter-BSS Network Allocation Vector (IBNAV). The second access point 102 decrements the value of IBNAV in a manner similar to other backoff time values, during which it will delay accessing the medium. FIG. 1C shows the wireless station 154A in cell 150 responding to the polling packet 128 by returning a responsive data packet "U1" 140. A timing diagram for the transmission of the responsive data packet "U1" is shown in FIG. 4. Subsequent, similar exchanges in cell 150 are shown in FIG. 4, where access point 152 sends the polling packet "D2" and the polled station in cell 150 responds with data packet "U2". Access point 152 then sends the polling packet "D3", but there is no response from the polled station in cell 150; so within a PIFS interval, access point 152 sends the polling packet "D4" and the polled station in cell 150 responds with data packet "U4". It is seen at this point in FIG. 1D and FIG. 4 that the NAV value has been counted down to zero in the stations of cell 150, signifying the end of the contention-free session (CFS) for cell 150. FIG. 1D also shows that the IBNAV value in the access point 102 and the CFTR value in the other stations of the overlapped cell 100 have also been counted down to zero. The second access point 102 in the cell 100 takes this as its cue to transmit a shield packet 119 to begin a contention-free session (CFS) for cell 100.

The method similarly assigns to the second access point 102 station in the second wireless LAN cell 100 that overlaps the first cell 150 a second contention-free period value CFTR=P7 longer than the first contention-free period value CFTR=P4. FIG. 1D shows the second access point 102 in the cell 100 transmitting a shield packet 119 during the period from T4 to T5. The shield packet 119 is a short packet, such as a Physical Layer Convergence Procedure (PLCP) header without the MAC data, as shown in FIG. 2A. The shield packet 119 makes the wireless channel appear busy to any station receiving the shield packet. This includes not only the member stations 104A, 104B, and 106 in cell 100, but also any stations in another overlapped cell, such as cell 150. The access point 152 and stations 154A and 154B of the overlapped cell 150 also receive the shield packet 119. All such stations receiving the shield packet 119 delay transmitting on what they perceive to be a busy channel. The transmitting access point 102 is thus assured that no other station will begin contending for the medium while the access point 102 is sending a beacon packet in the next step, shown in FIG. 1E.

Access point 102 in cell 100 sends its beacon packet 120 in FIG. 1E, including its contention-free period values of NAV (P6) and IBNAV (P7), to the member stations 104A (with a low QoS requirement 114A), 104B (with a high QoS requirement 114B) and 106 in the cell 100 during the period from T5 to T6. The stations 152, 154A, and 154B of the overlapped cell 150 also receive the beacon packet 120. FIG. 1F shows the point coordinator in access point 102 of cell 100 controlling the contention-free period within cell 100 using the polling packet 132 during the period from T6 to T7. FIG. 1G shows the wireless station 104B in cell 100 responding to the polling packet 132 by returning a responsive data packet 142. It is seen at this point in FIG. 1H that the NAV value has been counted down to zero in the stations of cell 100, signifying the end of the contention-free session (CFS) for cell 100. FIG. 1H also shows that the IBNAV value in the access point 152 and the CFTR value in the other stations of the overlapped cell 150 have also been counted down to zero. All of the stations in both cells 100 and 150 have their NAV and CFTR/IBNAV values at zero, and they take this as their cue to begin the contention period.

The method uses the Tiered Contention Multiple Access (TCMA) protocol to assign to first member stations in the first cell 150 a first shorter backoff value for high Quality of Service (QoS) data and a first longer backoff value for lower QoS data. FIG. 1H shows the station 154B in the cell 150, having a high QoS requirement 164B, decreasing its High QoS backoff period to zero and beginning TCMA contention. Station 154B transmits a request to send (RTS) packet 144 to station 154A during the period from T8 to T9. Station 154A responds by sending a clear-to-send (CTS) packet to station 154B.

Then, station 154B transmits its high QoS data packet 130 during the period from T9 to T10 in FIG. 1I. The backoff time is the interval that a member station waits after the expiration of the contention-free period P3, before the member station 154B contends for access to the medium. Since more than one member station in a cell may be competing for access, the actual backoff time for a particular station can be selected as one of several possible values. In one embodiment, the actual backoff time for each particular station is deterministically set, so as to reduce the length of idle periods. In another embodiment, the actual backoff time for each particular station is randomly drawn from a range of possible values between a minimum delay interval to a maximum delay interval. The range of possible backoff time values is a contention window. The backoff values assigned to a cell may be in the form of a specified contention window. High QoS data is typically isochronous data such as streaming video or audio data that must arrive at its destination at regular intervals. Low QoS data is typically file transfer data and email, which can be delayed in its delivery and yet still be acceptable. The Tiered Contention Multiple Access (TCMA) protocol coordinates the transmission of packets within a cell, so as to give preference to high QoS data over low QoS data, to insure that the required quality of service is maintained for each type of data.

The method uses the Tiered Contention Multiple Access (TCMA) protocol to assign to second member stations in the second cell 100 a second shorter backoff value for high QoS data and a second longer backoff value for lower QoS data.

The first and second cells are considered to be overlapped when one or more stations in the first cell can inadvertently receive packets from member stations or the access point of the other cell. The invention reduces the interference between the overlapped cells by coordinating the timing of their respective transmissions, while maintaining the TCMA protocol's preference for the transmission of high QoS data over low QoS data in each respective cell.

FIG. 3 shows a timing diagram for the transmission of the shield packet. A CFS is started with the shield packet, which is a short frame (e.g., Physical Layer Convergence Procedure (PLCP) header without MAC data). The AP will wait for an idle period of PIFS to transmit following the shield. If an (E)DCF transmission collides with the shield, the AP will hear the transmission and defer initiation of the CFS body. After completion of the (E)DCF transmission, the CFS will start, following a PIFS idle. Transmission of the shield before the CFS body is not always needed. For example, it is not needed if the AP knows that the idle gap between the CFS and the previous transmission is equal to PIFS; i.e., when the backoff delay is 1, during the last busy period.

FIG. 4 shows a timing diagram of a sample CFS structure. It includes the shield packet, the beacon packet, and the exchange of data packets during the contention-free period shown in FIGS. 1, 1A through 1C.

All stations listen to the channel; and when they receive the shield packet, they defer transmitting on what they perceive to be a busy channel. The transmitting access point is thus assured that no other station will begin contending for the medium while the access point is sending a beacon packet. If another station and the access point have simultaneously begun transmission, then the benefit of the shield packet is that the other station's (E)DCF transmissions colliding with the shield packet will cause postponement of the start of the CFS body by the access point until the channel is clear. The CFS is thus assured of no (E)DCF conflict because of its shorter Arbitration Interframe Space (AIFS). While the other station's colliding (E)DCF transmission is unsuccessful, the CFS body will be transmitted later by the access point without conflict. Channel time is saved this way if CFSs are longer than DCF transmissions. This method can also be applied to PCFSs if there is no other mechanism to protect them from collisions with (E)DCF transmissions, as there is in the point coordination function (PCF). Still further, a special shield packet may also be used in Inter-BSS NAV protection.

The following definitions are believed to be helpful to an understanding of the invention.

Contention-free burst (CFB): A technique for reducing MAC layer wireless medium (WM) access overhead and susceptibility to collisions, in which a single station may transfer a plurality of MAC protocol data units (MPDUs) during a single transmission opportunity (TXOP), retaining control of the WM by using interframe spaces sufficiently short that the entire burst appears to be a single instance of WM activity to contending stations.

Contention-free session (CFS): Any frame exchange sequence that may occur without contention following a successful channel access attempt. A CFS may involve one or more stations. A CFS may be initiated by any station. A contention-free burst (CFB) and an RTS/CTS exchange are both examples of a CFS. A contention free burst (CFB) is a special case of a contention-free session (CFS) that is started by a hybrid coordinator (HC).

Contention-free period (CFP): A time period during operation of a basic service set (BSS) when a point coordination function (PCF) or hybrid coordination function (HCF) is used, and transmission opportunities (TXOPs) are assigned to stations by a point coordinator (PC) or hybrid coordinator (HC), allowing frame exchanges to occur without inter-station contention for the wireless medium (WM) and at regular time intervals. The contention-free period (CFP) is the duration of a contention-free session (CFS).

Periodic contention-free session (PCFS): A contention-free session (CFS) that must occur at regular time intervals. A contention-free period (CFP) is an example of a PCFS. Both PCFSs and CFSs are needed, the PCFSs used for periodic traffic and the CFSs providing efficient use of channel time, as channel availability permits. When restricting the time to the next access attempt, the channel cannot be used sooner, even if needed and available; it limits efficiency of channel re-use.

The description of the invention can be simplified by considering that CFSs/PCFSs are initiated by Access Points (AP). However, CFSs/PCFSs can be initiated by any station, whether or not it is an AP.

In a multi-BSS system, there will still be interference between BSSs assigned the same channel, once channels have been assigned to the BSSs. Allocation of the channel time is achieved through dynamic bandwidth allocation, which enables sharing of the channel time among co-channel BSSs efficiently, so that no channel time is left idle. Because there is no central controller, distributed, prioritized, dynamic bandwidth allocation algorithms are needed in order to coordinate multi-BSS channel reuse.

A contention-free burst (CFB) is a special case of a contention-free session (CFS) that is started by a hybrid coordinator (HC). It would be desirable that CFSs/PCFSs have priority access over (E)DCF transmissions. It would also be desirable for (E)DCF transmissions to access the channel at an assigned priority. It would still further be desirable for CFSs to be able to regain control of the channel periodically and conflict-free. It would also be desirable that there are no conflicts with CFSs from other BSSs or (E)DCF transmissions. Finally, it would be desirable to have efficient channel re-use (with no channel left idle) that is greater than or equal to the dynamic bandwidth allocation.

Other workers in the field have proposed that (E)DCF can be used by the CFSs to access the channel. The CFSs would be placed in the highest priority class which is above the highest priority in (E)DCF. Shorter AIFS would be used for CFS access, which helps avoid collisions with (E)DCF transmissions. Backoff would help deal with CFS conflicts among BSSs. However, such proposals raise concerns about random backoff. With a random backoff, (E)STAs may access the channel before the HC, since (PIFS+1)=DIFS allows a (E)DCF station to transmit. Also, a long backoff leaves many idle slots, which would allow (E)STAs to transmit before HCs. Furthermore, a short backoff causes collisions between CFSs. Such proposals also raise concerns about fixed or minimum re-visit time. When restricting the time to the next access attempt, the channel cannot be used sooner, even if needed and available. Also, although this may be a good approach for PCFSs, it limits efficiency of channel re-use.

These problems are avoided by the cyclic prioritized multiple access (CPMA) method for contention-free sessions (CFS). The cyclic prioritized multiple access (CPMA) method includes three features:

1—Fixed Deterministic Post-Backoff, which reduces conflicts between APs.

2—Staggered Start-up, which provides contiguous sequences of CFSs to deter collisions with (E)STAs. (Staggered Start-up is an optional feature.)

3—Preemptive 'Pegging', which preserves CFS sequence contiguity. ('Pegging' is an optional feature.)

The cyclic prioritized multiple access (CPMA) method requires a mechanism for 'busy' channel detection (detection of the start and end of a CFS), such as the Inter-BBS NAV. This is described in the copending U.S. patent application Ser. No. 10/187,132, filed Jun. 28, 2002, by Mathilde Benveniste, entitled "Hybrid Coordination Function (HCF) Access Through Tiered Contention And Overlapped Wireless Cell Mitigation," which is incorporated by reference. The cyclic prioritized multiple access (CPMA) method also requires fully overlapped BSSs or partially overlapping BSSs with IBNAV protection. This is also described in the copending U.S. patent application Ser. No. 10/187,132. An alternative to such protection is 'parallel' backoff to avoid "Neighborhood Capture", as is described in the copending regular U.S. patent application Ser. No. 10/256,384, filed Sep. 27, 2002 by Mathilde Benveniste, entitled "Wireless LANS And Neighborhood Capture," which is incorporated by reference.

The Fixed Deterministic Post-Backoff feature of cyclic prioritized multiple access (CPMA) reduces conflicts between access points of overlapping cells. Contention-free sessions (CFSs) can be generated, one from each overlapping cell. Each active access point engages in a fixed deterministic post-backoff. A fixed deterministic backoff delay (Bkoff times a fixed number of idle time slots) is used by all access points, with the value of Bkoff being greater than the number of overlapping cells. The Bkoff should large enough to enable the traffic that needs to be accommodated by the channel. Each access point has a backoff timer that is counted down using the shortest interframe space possible (typically PIFS). A contention-free session (CFS) is initiated when the backoff timer expires, and it is then reset to the value of Bkoff to start a new cycle. A cycle is measured in terms of idle time slots, instead of a fixed time interval. Contention-based transmissions can be attempted by an access point or other stations in the cell using their assigned priority while the access point is counting down its backoff timer. A new access point can get started and resolve possible collisions by a small random backoff. Subsequent contention-free sessions (CFSs) will not conflict, given an existing sequence of non-conflicting CFSs, since the follower access point's backoff delay exceeds that of the leader's by at least one times the fixed number of idle time slots. In this manner, contention-free sessions can be conducted without interference in the first and second cells.

Figure 5:
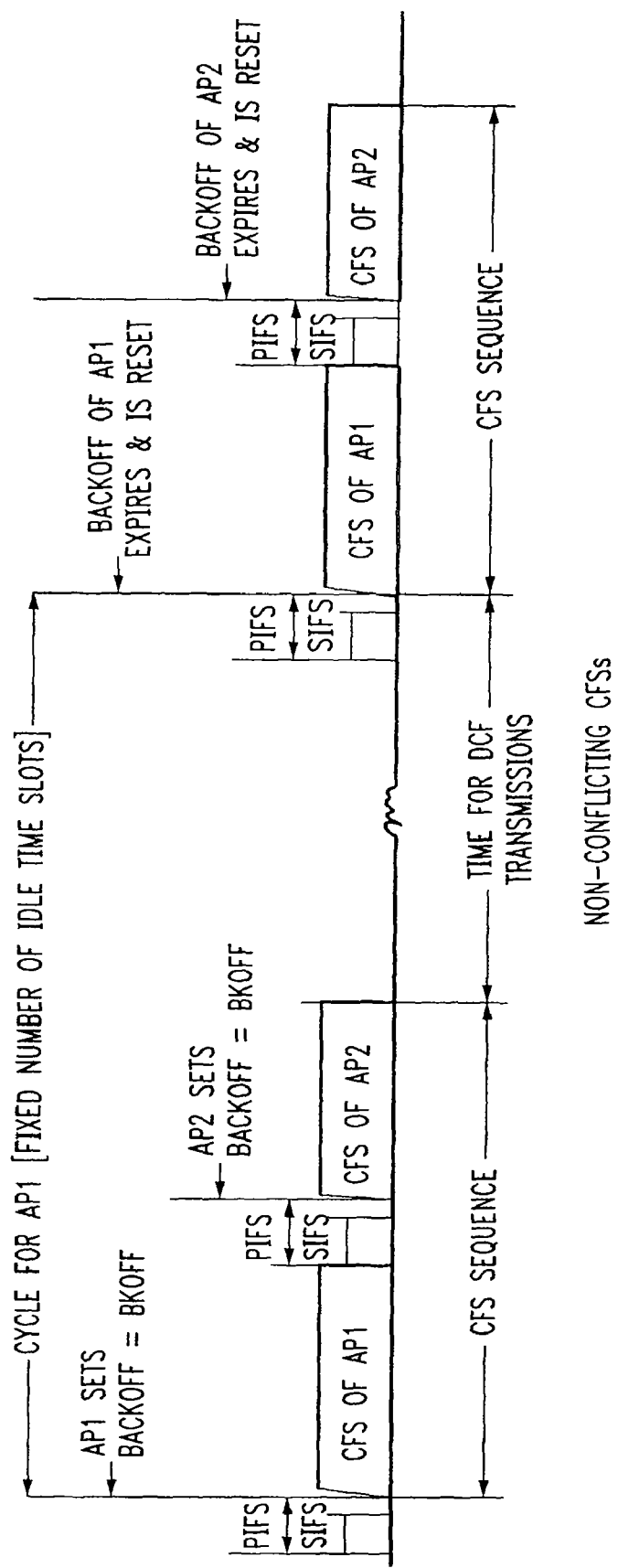
FIG. 5 shows a timing diagram of non-conflicting contention-free sessions (CFS) for access point 152 (AP1) and access point 102 (AP2).

FIG. 5 shows a timing diagram of non-conflicting contention free sessions (CFS) for access point 152 (AP1) and access point 102 (AP2). The figure shows the CFSs repeating in cycles. Contention-free sessions (CFSs) are generated, one from each overlapping BSS. Each active AP engages in fixed deterministic post-backoff, which is characterized by the post-backoff being ON. A fixed deterministic backoff delay, Bkoff, is used by all APs, with Bkoff greater than the number of overlapping BSS. The Bkoff should large enough to enable the traffic that can be accommodated by the channel. FIG. 5 shows that the channel is accessed and the backoff timer is counted down using the shortest AIFS possible. A CFS is initiated when backoff expires and the backoff is reset to Bkoff, which starts a new cycle. A cycle is measured in terms of idle time slots; it does not represent a fixed time interval. (E)DCF transmissions are attempted by their assigned priority while the AP is counting its backoff down. A new AP can get started and resolve possible collisions by a small random backoff. FIG. 5 shows that subsequent CFSs will not conflict, given a sequence of non-conflicting CFSs. Because their previous CFSs did not conflict, the follower AP's backoff delay exceeds that of the leader's by at least one.

In general, the cyclic prioritized multiple access (CPMA) method can get started by a random backoff, 0, 1 ... [small value]. To reduce the probability of collisions with (E)DCF transmissions, a contiguous sequence of CFBs (consecutive CFBs separated by idle gaps<=PIFS) is generated by observing the following startup procedure. If there is no other AP present, then the first AP will get started after waiting for a cycle, which is the time it takes Bkoff idle time slots to expire (with deferral time).

Figure 6:
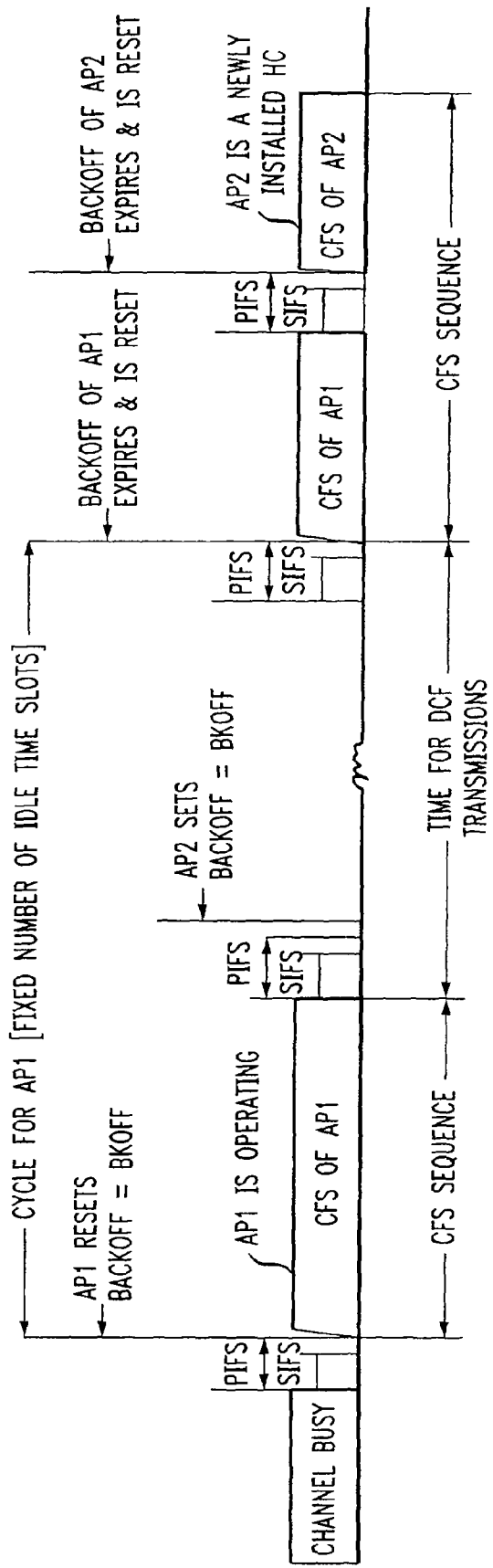
FIG. 6 shows a timing diagram of how access point 102 (AP2) listens for a PIFS idle following a busy channel and then starts transmitting a minimal interval after the contention-free session (CFS) for access point 152 (AP1).

FIG. 6 shows a timing diagram of how access point 102 (AP2) listens for a PIFS idle following a busy channel and then starts transmitting a minimal interval after the contention free session (CFS) for access point 152 (AP1). If one AP is operating and a second AP powers on, AP2 listens to the channel until a PIFS Idle is observed following a busy channel, or for another indication of a CFS. Then it looks for the first idle longer than PIFS and sets its post-backoff delay to transmit always right after AP1. An idle period X=PIFS+x, x>0, has been detected at time t; AP2's backoff at time t is set at Bkoff−x. If several APs power on during the same cycle, collision between new APs is possible. It can be resolved by a random backoff, 0, 11 . . . [small value]. As is shown in FIG. 6, AP2 listens to the channel until a PIFS Idle is observed following a busy channel. Then it looks for the first idle longer than PIFS and sets its post-backoff delay to transmit always right after AP1. When an idle period DIFS=PIFS+1 has been detected at time t, AP2's backoff at time t is set at Bkoff−1.

Figure 7:
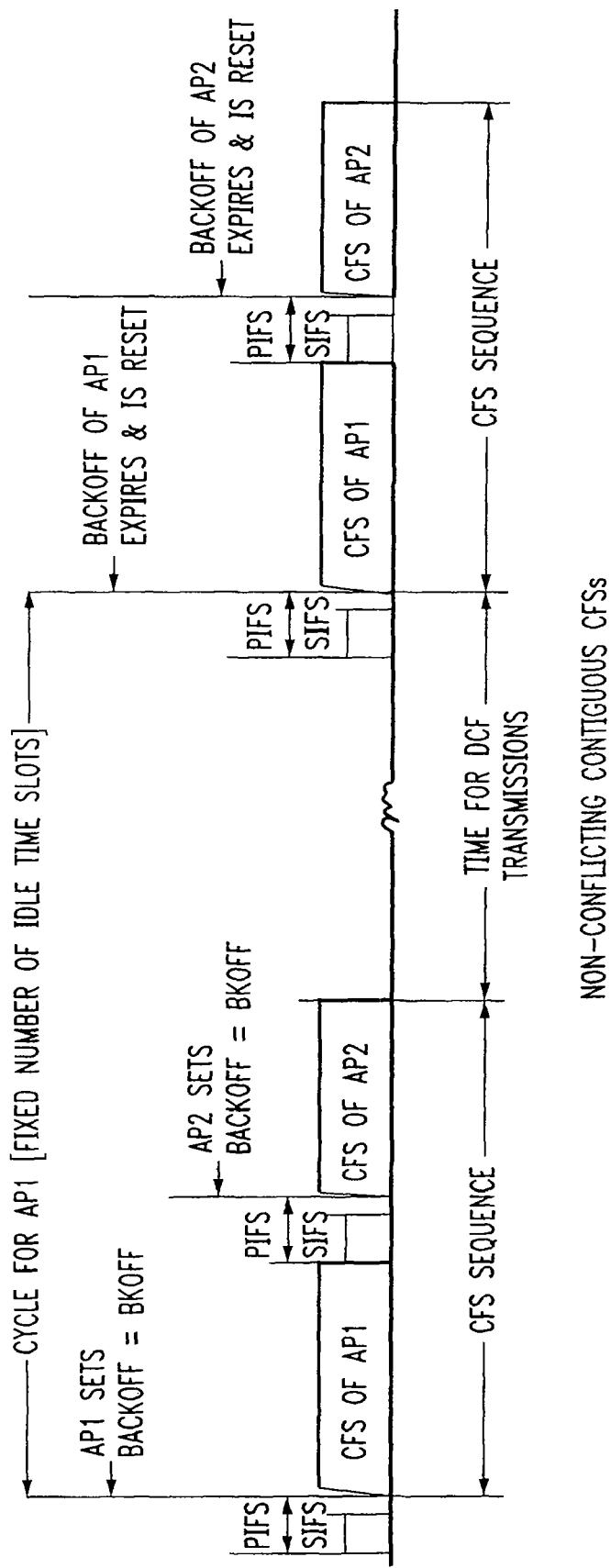
FIG. 7 shows a timing diagram of the successful startup of access point 102 (AP2) after the contention-free session (CFS) for access point 152 (AP1).

FIG. 7 shows a timing diagram of the successful startup of access point 102 (AP2) after the contention-free session (CFS) for access point 152 (AP1). These are non-conflicting, contiguous CFSs. Subsequent CFSs will be contiguous, given a sequence of contiguous CFSs. Because their previous CFSs were contiguous, the follower AP's backoff delay exceeds that of the leader's by exactly one. NAV protection and longer AIFS prevent DCF transmissions from conflicting with new CFSs.

Figure 8:
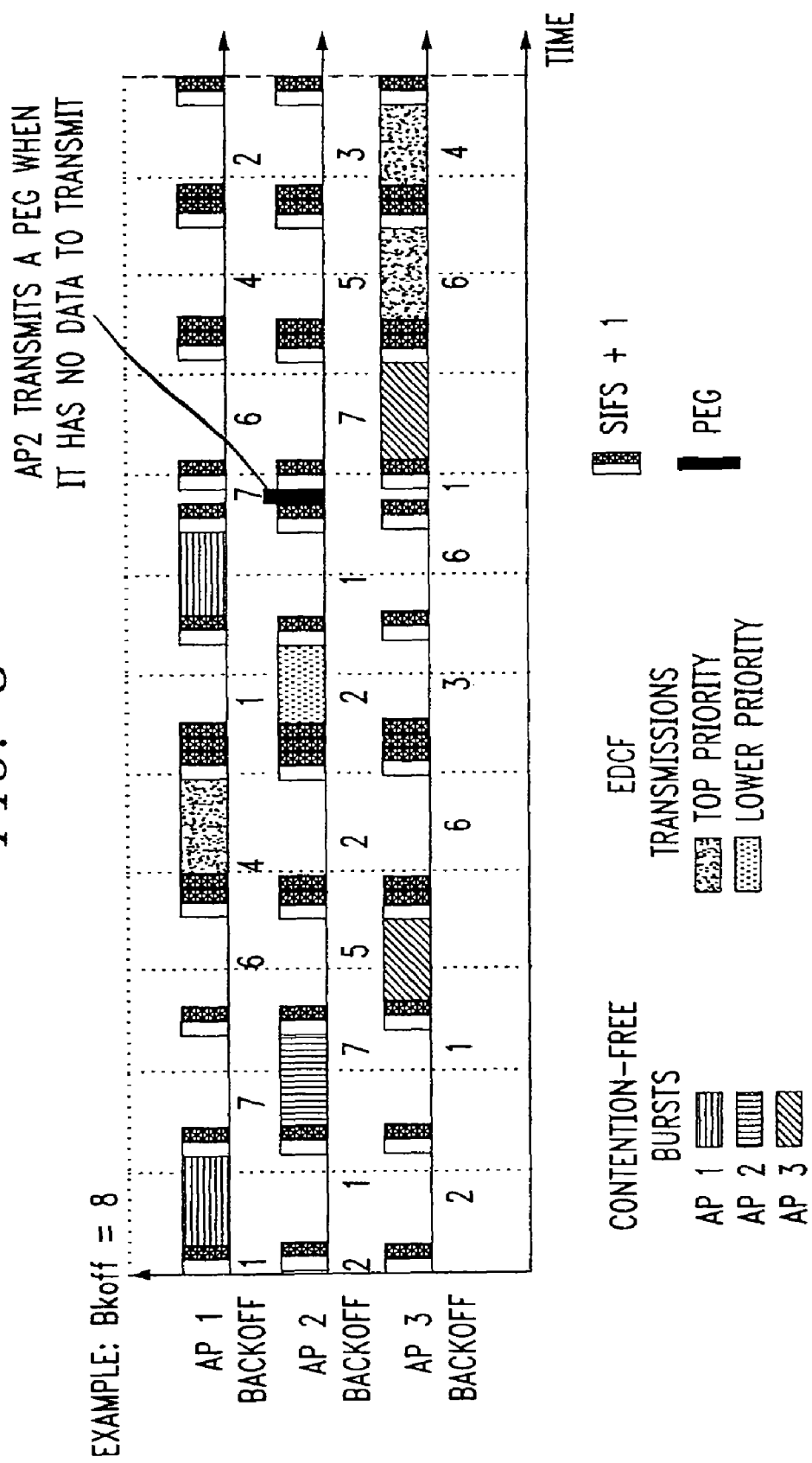
FIG. 8 shows a timing diagram of access point 102 (AP2) transmitting a preemptive peg packet when it has no data to transmit in order to maintain contiguity of its timing position in the periodic sequence of contention-free sessions (CFS) in the transmission order of access point 152 (AP1), access point 102 (AP2), and a third access point (AP3).

FIG. 8 shows a timing diagram of access point 102 (AP2) transmitting a preemptive peg packet when it has no data to transmit in order to maintain contiguity of its timing position in the periodic sequence of contention-free sessions (CFS) in the transmission order of access point 152 (AP1), access point 102 (AP2), and a third access point (AP3). Pegging maintains contiguity. If an AP has no traffic, it will transmit a short pegging packet and set its backoff=Bkoff. In this manner, no gaps of length DIFS+1 are left idle, and thus (E)DCF stations cannot seize the channel until all APs have completed one CFS per cycle.

Figure 9:
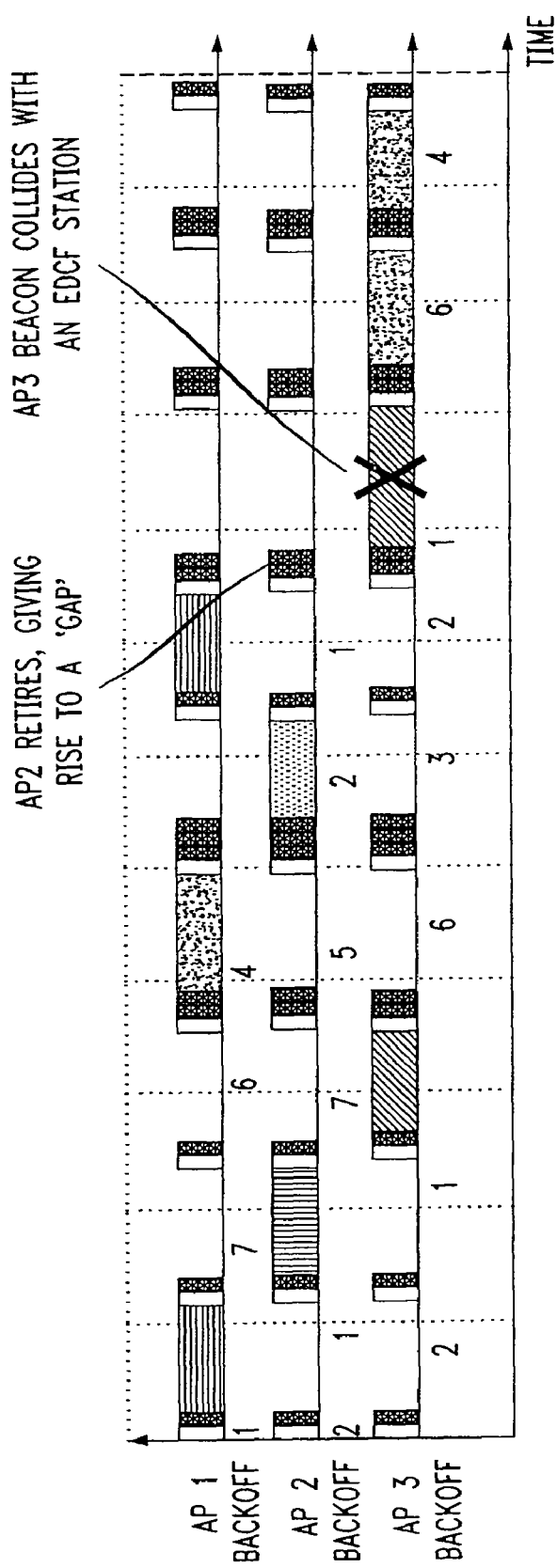
FIG. 9 shows a timing diagram illustrating the result of access point 102 (AP2) retiring from the periodic sequence of contention-free sessions (CFS) shown in FIG. 8, which results in a gap of long enough duration to inadvertently permit a DCF wireless station 104B to begin contention for the channel and transmit a packet that collides with the periodic beacon packet of AP3.

FIG. 9 shows a timing diagram illustrating the result of access point 102 (AP2) retiring from the periodic sequence of contention-free sessions (CFS) shown in FIG. 8, which results in a gap of long enough duration to inadvertently permit a DCF wireless station 104B to begin contention for the channel and transmit a packet that collides with the periodic beacon packet of AP3. If an AP retires or does not use pegging, gaps or idle periods >PIFS will occur. Then, a collision between its follower AP and an (E)DCF station is possible. Newly activated APs can help take up excess void (two retirements back-to-back) in the sequence. CFSs can be protected from (E)DCF transmissions by using a shield packet, as described in the copending U.S. patent application Ser. No. 10/256,299 filed Sep. 27, 2002 by Mathilde Benveniste, entitled "Shield: Protecting High Priority Channel Access Attempts In Overlapped Wireless Cells," which is incorporated by reference.

Figure 10:
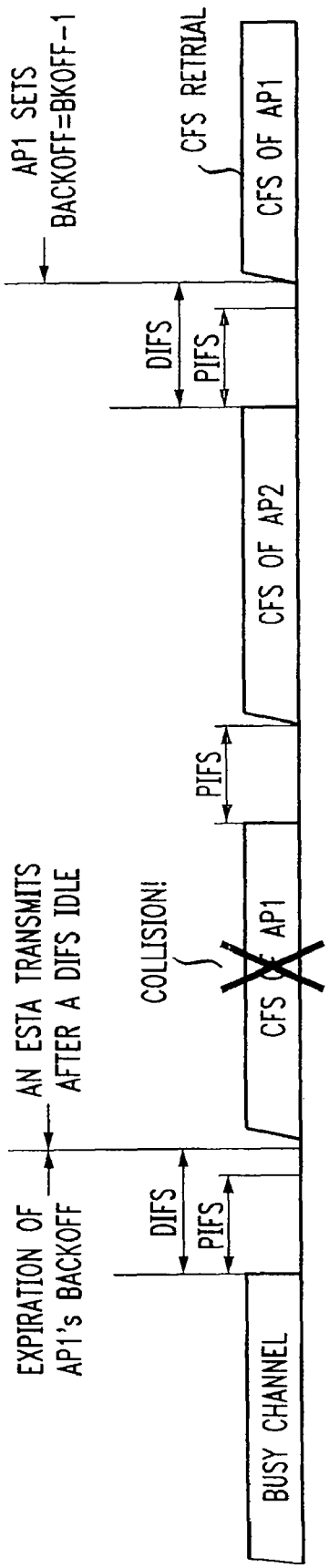
FIG. 10 shows a timing diagram illustrating that when a periodic sequence of contention-free sessions (CFS) have intervals no longer than PIFS separating them, only the first contention-free session (CFS) has any probability of colliding with a DCF wireless station contending for the channel.

FIG. 10 shows a timing diagram illustrating that when a periodic sequence of contention-free sessions (CFS) have intervals no longer than PIFS separating them, only the first contention-free session (CFS) has any probability of colliding with a DCF wireless station contending for the channel. Given a contiguous sequence of CFSs (no gaps due to retirements), only the first AP can collide with (E)DCF stations. In lighter traffic this is a low probability. Subsequent APs do not collide with (E)DCF stations because of their shorter AIFS. CFSs can be protected from (E)DCF transmissions by using a shield packet. If an AP experiences a collision with (E)DCF transmission, it may reset its backoff=Bkoff−x, thus moving from the head of the sequence behind another AP. Another AP will thus take the lead position, sharing the collision probability.

In summary, the cyclic prioritized multiple access (CPMA) method includes the fixed deterministic post-backoff feature, which prevents collisions among the different APs. The staggered start up feature achieves contiguous CFS sequences. Contiguity decreases the probability of collision with (E)DCF transmissions, since no idle gaps are left of the size of the AIFS of (E)DCF stations. The preemptive 'pegging' feature maintains contiguity of CFS sequences. If collisions occur, a small random backoff is used to resolve conflicts. The probability of conflicts is still less than with simple random backoff.

PCFSs provide regular access to the channel for periodic traffic. The use of PCFSs alone cannot not provide efficient dynamic bandwidth allocation. CFSs generated on a contention basis must complement PCFSs. PCFSs and CFSs access the channel with the shortest AIFS. Quality of service (QoS) can be managed while using the cyclic prioritized multiple access (CPMA) method by an AP scheduling traffic as follows: Periodic traffic is transmitted in PCFSs; non-periodic traffic is placed either in a PCFS or in its allotted CFSs according to traffic priority; delay-sensitive traffic is scheduled first, followed by traffic of lower priorities.

Various illustrative examples of the invention have been described in detail. In addition, however, many modifications and changes can be made to these examples without departing from the nature and spirit of the invention.

What is claimed is:

1. A method for reducing interference between overlapping first and second wireless local area network cells in a medium, each of the first and second wireless local area network cells including a respective plurality of member stations, comprising:
   coordinating by a first access point station in the first wireless local area network cell a periodic sequence of first contention-free sessions, each of the first contention-free sessions including multiple bursts with other member stations in the first wireless local area network cell, and retaining a control of the medium by the first access point station by using interframe spaces between the multiple bursts such that the multiple bursts appear to contending stations to be a single instance of activity in the medium;
   coordinating by a second access point station in the second wireless local area network cell a periodic sequence of second contention-free sessions, each of the second contention-free sessions including multiple bursts with other member stations in the second wireless local area network cell, and retaining the control of the medium by the second access point station by using interframe spaces between the multiple bursts such that the multiple bursts appear to contending stations to be a single instance of activity in the medium;
   transmitting by the first access point station a preemptive peg packet to maintain a contiguity of a transmission timing position of the first access point station with respect to a timing position of the second contention-free sessions transmitted by the second access point station; and
   the preemptive peg packet preventing gaps to be left idle for longer than a distributed coordination function interframe space;
   whereby other stations are prevented from using the distributed coordination function interframe space to seize the medium, until the first and second access point stations have completed one contention-free session per periodic cycle.

2. The method of claim 1, which further comprises:
   setting by the first access point station a backoff timer to a fixed deterministic post-backoff delay, which has a value of Bkoff times a fixed number of idle time slots, the value of Bkoff being greater than a number of overlapping cells;
   counting down the backoff timer by the first access point station;
   transmitting another one of the first contention-free sessions by the first access point station when the backoff timer expires; and
   resetting the backoff timer to the value of Bkoff to start a new cycle.

3. The method of claim 2, which further comprises:
   the backoff timer being counted down using an interframe space.

4. The method of claim 3, wherein the interframe space being a priority interframe space.

5. The method of claim 3, wherein the interframe space being a minimum arbitration interframe space.

6. The method of claim 2, further comprises:
   listening by the second access point station in the second wireless local area network cell to the activity in the medium and detecting an end to one of the first contention-free sessions indicated by an interval longer than a priority interframe space idle interval following an end to the activity in the medium;
   setting a second post-backoff delay by the second access point station to transmit a minimal interval after the one of first contention-free sessions of the first access point station; and
   coordinating by the second access point station in the second wireless local area network cell a second contention-free session of the second contention-free sessions, the second contention-free session including multiple bursts with other access point stations in the second cell, and retaining the control of the medium by the second access point station by using interframe spaces between the multiple bursts such that the multiple bursts appear to contending stations to be a single instance of activity in the medium.

7. The method of claim 6, wherein the second post-backoff delay being a minimum arbitration interframe space.

8. The method of claim 6, further comprises:
   initiating by the second access point station another one of the second contention-free sessions when the second post-backoff delay is counted down to zero; and
   resetting the second post-backoff delay to start a new cycle.

9. The method of claim 6, further comprises:
   separating consecutive ones of the first and second contention-free sessions by idle gaps which are less than a priority interframe space.

10. The method of claim 9, where the setting the second post-backoff delay further comprises:
    detecting an idle period X=priority interframe space +x, x>0 at time t; and
    setting the second post-backoff delay at time t, to a value of Bkoff−x.

11. A wireless communications system having reduced interference between overlapping first and second wireless local area network cells in a medium, each of the first and second wireless local area network cells including a respective plurality of member stations, comprising:
    a first access point station in the first wireless local area network cell, wherein the first access point station coordinates in the first wireless local area network cell a periodic sequence of first contention-free sessions, each of the first contention-free sessions including multiple bursts with other member stations in the first wireless local area network cell, and retaining a control of the medium by the first access point station by using interframe spaces between the multiple bursts such that the multiple bursts appear to contending stations to be a single instance of activity in the medium;

a second access point station in the second wireless local area network cell, wherein the second access point station coordinates in the second wireless local area network cell a periodic sequence of second contention-free sessions, each of the second contention-free sessions including multiple bursts with other member stations in the second wireless local area network cell, and retaining the control of the medium by the second access point station by using interframe spaces between the multiple bursts such that the multiple bursts appear to contending stations to be a single instance of activity in the medium;

wherein the first access point station transmits a preemptive peg packet to maintain a contiguity of a transmission timing position of the first access point station with respect to a timing position of the second contention-free sessions transmitted by the second access point station; and wherein the preemptive peg packet prevents gaps to be left idle for longer than a distributed coordination function interframe space;

whereby other stations are prevented from using the distributed coordination function interframe space contention to seize the medium, until the first and second access point stations have completed one contention-free session per periodic cycle.

12. The system of claim 11, further comprises:
the first access point station setting a backoff timer to a fixed deterministic post-backoff delay, which has a value of Bkoff times a fixed number of idle time slots, the value of Bkoff being greater than a number of overlapping cells;
the first access point station counting down the backoff timer;
the first access point station transmitting another one of the first contention-free sessions when the backoff timer expires; and
the first access point station resetting the backoff timer to the value of Bkoff to start a new cycle.

13. The system of claim 12, further comprises:
the backoff timer being counted down using an interframe space.

14. The system of claim 13, wherein the interframe space being a priority interframe space.

15. The system of claim 13, wherein the interframe space being a minimum arbitration interframe space.

16. The system of claim 12, further comprises:
the second access point station listening in the second wireless local area network cell to the activity in the medium and detecting an end to one of the first contention-free sessions indicated by an interval longer than a priority interframe space idle interval following an end to the activity in the medium;
the second access point station setting a second post-backoff delay to transmit a minimal interval after the one of first contention-free sessions of the first access point station; and
the second access point station coordinating in the second wireless local area network cell a second contention-free session of the second contention-free sessions, the second contention-free session including multiple bursts with other access point stations in the second wireless local area network cell, and retaining the control of the medium by the second access point station by using interframe spaces between the multiple bursts such that the multiple bursts appear to contending stations to be a single instance of activity in the medium.

17. The system of claim 16, wherein the second post-backoff delay being a minimum arbitration interframe space.

18. The system of claim 16, further comprises:
the second access point station initiating another one of the second contention-free sessions when the second post-backoff delay is counted down to zero; and
the second access point station resetting the second post-backoff delay to start a new cycle.

19. The system of claim 16, further comprises:
the second access point station separating consecutive ones of the first and second contention-free sessions by idle gaps which are less than a priority interframe space.

20. The system of claim 19, in which the setting the second post-backoff delay further comprises:
the second access point station detecting an idle period X=priority interframe space +x, x>0 at time t; and
the second access point station setting the second post-backoff delay at time t, to a value of Bkoff−x.

* * * * *